(12) United States Patent
Beye et al.

(10) Patent No.: US 9,241,541 B2
(45) Date of Patent: *Jan. 26, 2016

(54) METHOD OF MANUFACTURING A CONTOURED FLUID-FILLED CHAMBER WITH A TENSILE MEMBER

(71) Applicant: Nike, Inc., Beaverton, OR (US)

(72) Inventors: Douglas A. Beye, Beaverton, OR (US); Benjamin J. Monfils, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 273 days.

This patent is subject to a terminal disclaimer.

(21) Appl. No.: 13/907,141

(22) Filed: May 31, 2013

(65) Prior Publication Data

US 2013/0333827 A1 Dec. 19, 2013

Related U.S. Application Data

(63) Continuation of application No. 12/778,921, filed on May 12, 2010, now Pat. No. 8,470,113.

(51) Int. Cl.
A43D 25/00 (2006.01)
A43D 25/12 (2006.01)
A43B 13/20 (2006.01)

(52) U.S. Cl.
CPC .............. *A43D 25/123* (2013.01); *A43B 13/20* (2013.01)

(58) Field of Classification Search
CPC .............................. A43D 25/123; A43B 13/20
USPC ........................................................ 156/145
See application file for complete search history.

(56) References Cited

U.S. PATENT DOCUMENTS

| 3,253,355 | A |   | 5/1966 | Menken |
|---|---|---|---|---|
| 3,974,532 | A |   | 8/1976 | Ecchuya |
| 3,984,926 | A |   | 10/1976 | Calderon |

(Continued)

FOREIGN PATENT DOCUMENTS

| GB |   | 2217576 | A | * | 11/1989 |
|---|---|---|---|---|---|
| WO |   | 2009023370 |   |   | 2/2009 |

OTHER PUBLICATIONS

International Search Report and Written Opinion mailed Sep. 2, 2011, in PCT Application No. PCT/US2011/031621.

(Continued)

*Primary Examiner* — Jeff Aftergut
(74) *Attorney, Agent, or Firm* — Honigman Miller Schwartz and Cohn LLP; Matthew H. Szalach; Jonathan P. O'Brien

(57) ABSTRACT

A fluid-filled chamber may include an upper barrier portion, a lower barrier portion, and a tensile member. An upper tensile layer of the tensile member may be secured to the upper barrier portion, and a lower tensile layer of the tensile member may be secured to the lower barrier portion. The upper barrier portion and the lower barrier portion may have first areas and second areas. The first areas may be indentations extending into the chamber, and the second areas may be protrusions extending outward from the chamber. At least a portion of the first areas may be unbonded with the upper barrier portion and the lower barrier portion. Accordingly, one or more properties of the chamber, such as a flexibility, stiffness, rigidity, tensile response, compressibility, or force attenuation property, may be altered.

19 Claims, 35 Drawing Sheets

(56) References Cited

U.S. PATENT DOCUMENTS

| | | |
|---|---|---|
| 4,025,974 A | 5/1977 | Leav et al. |
| 4,183,156 A | 1/1980 | Rudy |
| 4,219,945 A | 9/1980 | Rudy |
| 4,287,250 A | 9/1981 | Rudy |
| 4,340,626 A | 7/1982 | Rudy |
| 4,513,449 A | 4/1985 | Donzis |
| 4,619,055 A | 10/1986 | Davidson |
| 4,768,295 A | 9/1988 | Ito |
| 4,874,640 A | 10/1989 | Donzis |
| 4,906,502 A | 3/1990 | Rudy |
| 4,936,029 A | 6/1990 | Rudy |
| 5,022,109 A | 6/1991 | Pekar |
| 5,042,176 A | 8/1991 | Rudy |
| 5,083,361 A | 1/1992 | Rudy |
| 5,134,790 A | 8/1992 | Woitschaetzke et al. |
| 5,329,656 A | 7/1994 | Leggett |
| 5,369,896 A | 12/1994 | Frachey et al. |
| 5,384,977 A | 1/1995 | Chee |
| 5,543,194 A | 8/1996 | Rudy |
| 5,572,804 A | 11/1996 | Skaja et al. |
| 5,630,237 A | 5/1997 | Ku |
| 5,713,141 A | 2/1998 | Mitchell et al. |
| 5,741,568 A | 4/1998 | Rudy |
| 5,802,739 A | 9/1998 | Potter et al. |
| 5,918,383 A | 7/1999 | Chee |
| 5,952,065 A | 9/1999 | Mitchell et al. |
| 5,987,781 A | 11/1999 | Pavesi et al. |
| 5,993,585 A | 11/1999 | Goodwin et al. |
| 6,013,340 A | 1/2000 | Bonk et al. |
| 6,029,962 A | 2/2000 | Shorten et al. |
| 6,041,521 A | 3/2000 | Wong |
| 6,082,025 A | 7/2000 | Bonk et al. |
| 6,098,313 A | 8/2000 | Skaja |
| 6,119,371 A | 9/2000 | Goodwin et al. |
| 6,127,010 A | 10/2000 | Rudy |
| 6,127,026 A | 10/2000 | Bonk et al. |
| 6,203,868 B1 | 3/2001 | Bonk et al. |
| 6,321,465 B1 | 11/2001 | Bonk et al. |
| 6,385,864 B1 | 5/2002 | Sell, Jr. et al. |
| 6,446,289 B1 | 9/2002 | Su et al. |
| 6,837,951 B2 | 1/2005 | Rapaport |
| 7,070,845 B2 | 7/2006 | Thomas et al. |
| 7,076,891 B2 | 7/2006 | Goodwin |
| 7,131,218 B2 | 11/2006 | Schindler |
| 7,132,032 B2 | 11/2006 | Tawney et al. |
| 7,409,779 B2 | 8/2008 | Dojan et al. |
| 7,426,766 B2 | 9/2008 | Gammons |
| 7,555,851 B2 | 7/2009 | Hazenberg et al. |
| 7,591,919 B2 | 9/2009 | Schindler et al. |
| 8,470,113 B2 * | 6/2013 | Beye et al. .................. 156/145 |
| 2002/0121031 A1 | 9/2002 | Smith et al. |
| 2003/0097767 A1 | 5/2003 | Perkinson |
| 2005/0039346 A1 | 2/2005 | Thomas et al. |
| 2005/0097777 A1 | 5/2005 | Goodwin |
| 2005/0183287 A1 | 8/2005 | Schindler |
| 2005/0229320 A1 | 10/2005 | Wu |
| 2006/0225304 A1 | 10/2006 | Goodwin |
| 2007/0169379 A1 | 7/2007 | Hazenberg et al. |
| 2008/0066342 A1 | 3/2008 | Park |
| 2008/0209763 A1 | 9/2008 | Lichfield et al. |
| 2008/0276490 A1 | 11/2008 | Holt et al. |
| 2009/0013558 A1 | 1/2009 | Hazenberg et al. |
| 2009/0045546 A1 | 2/2009 | Schindler |
| 2009/0045547 A1 * | 2/2009 | Schindler et al. ............. 264/241 |
| 2009/0288312 A1 | 11/2009 | Dua |
| 2009/0288313 A1 | 11/2009 | Rapaport et al. |
| 2011/0030144 A1 | 2/2011 | Flick et al. |

OTHER PUBLICATIONS

International Search Report and Written Opinion mailed Sep. 2, 2012, in PCT Application No. PCT/US2011/031625.
Office Action mailed Oct. 15, 2012, in U.S. Appl. No. 12/778,909.
Office Action mailed Sep. 12, 2012, in U.S. Appl. No. 12/778,921.

* cited by examiner

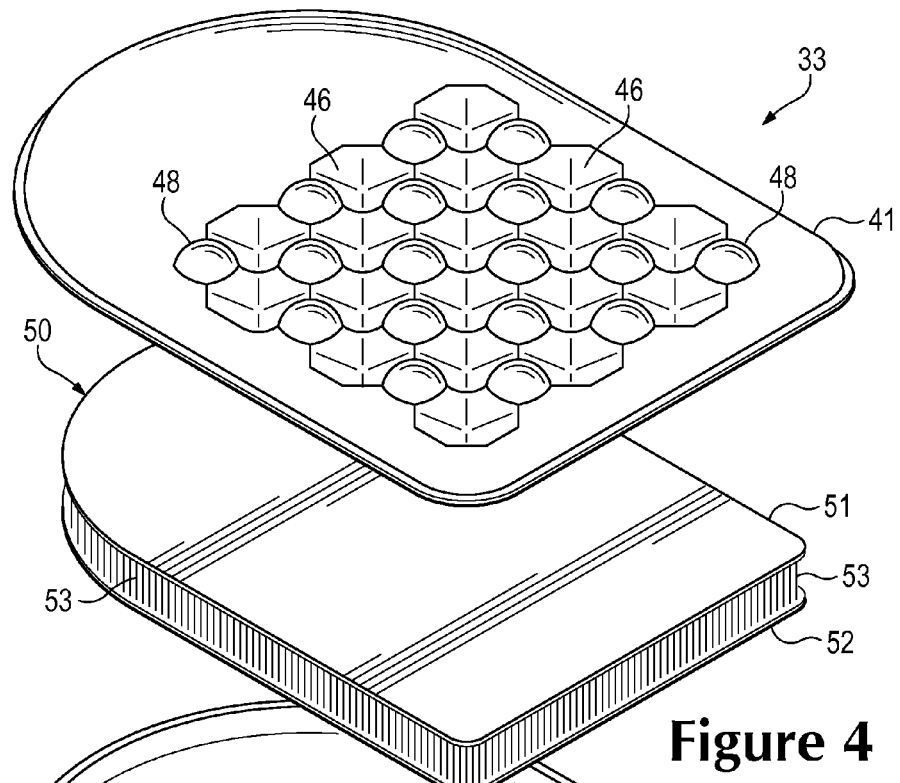
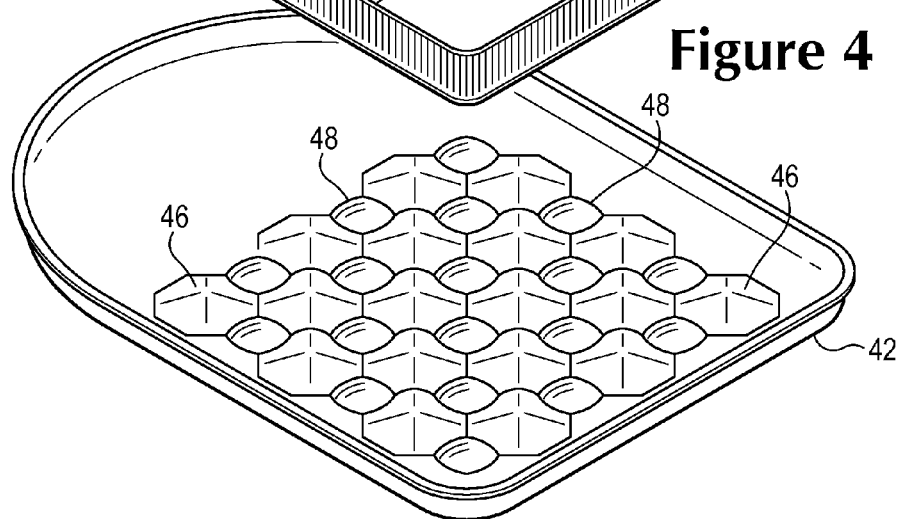
Figure 4

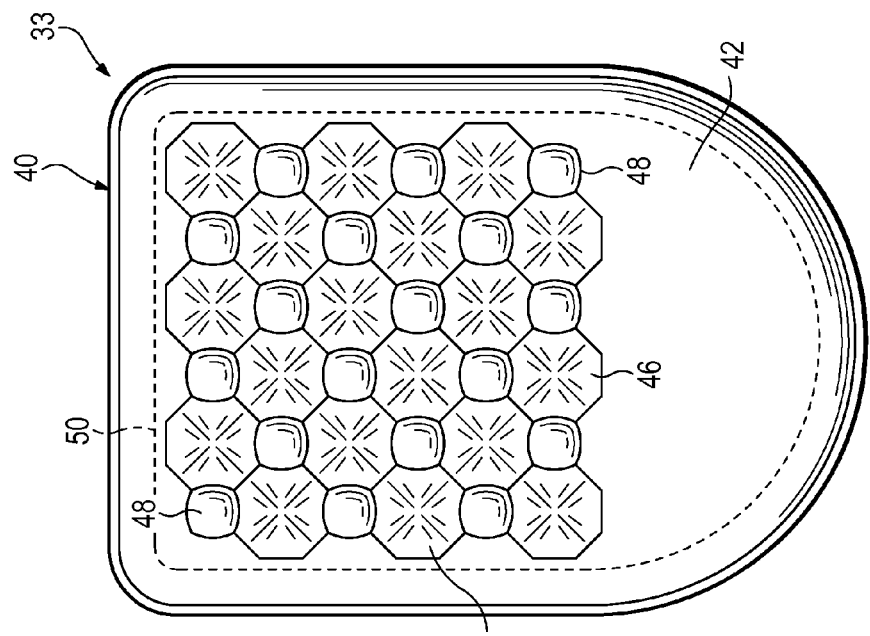
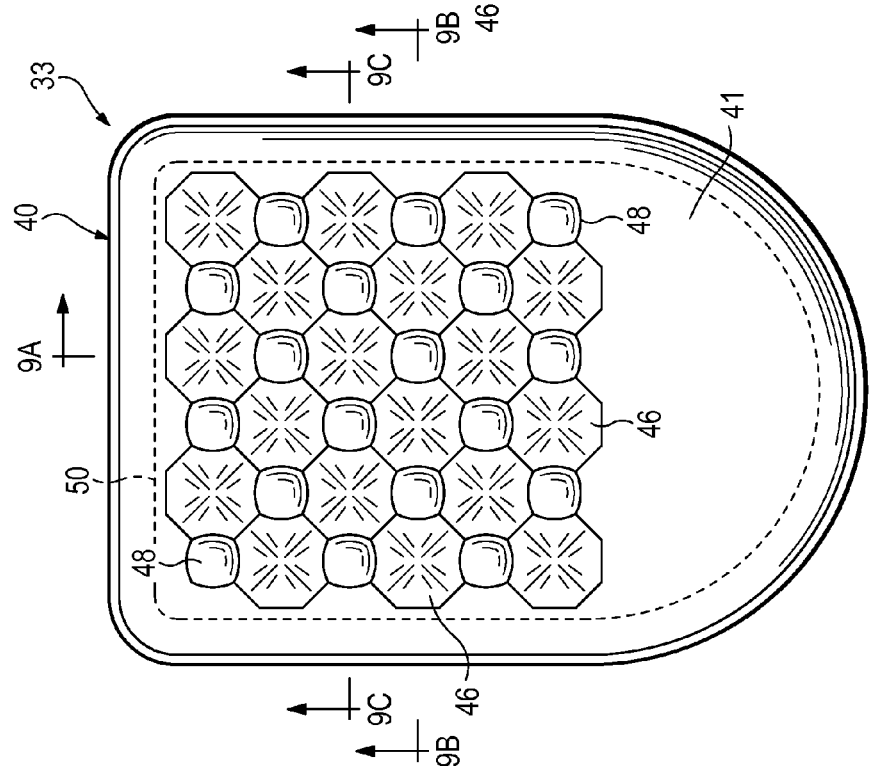

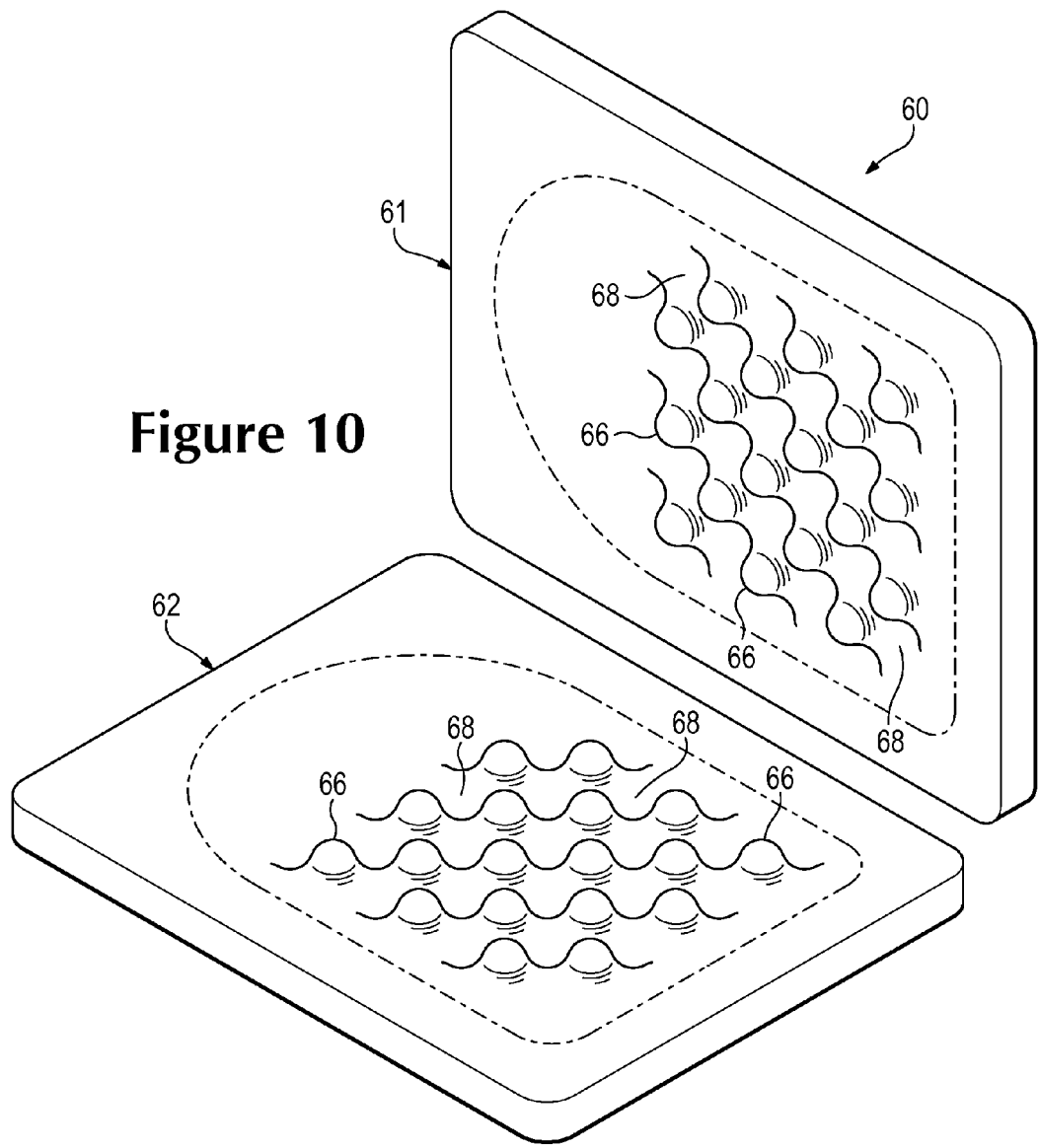

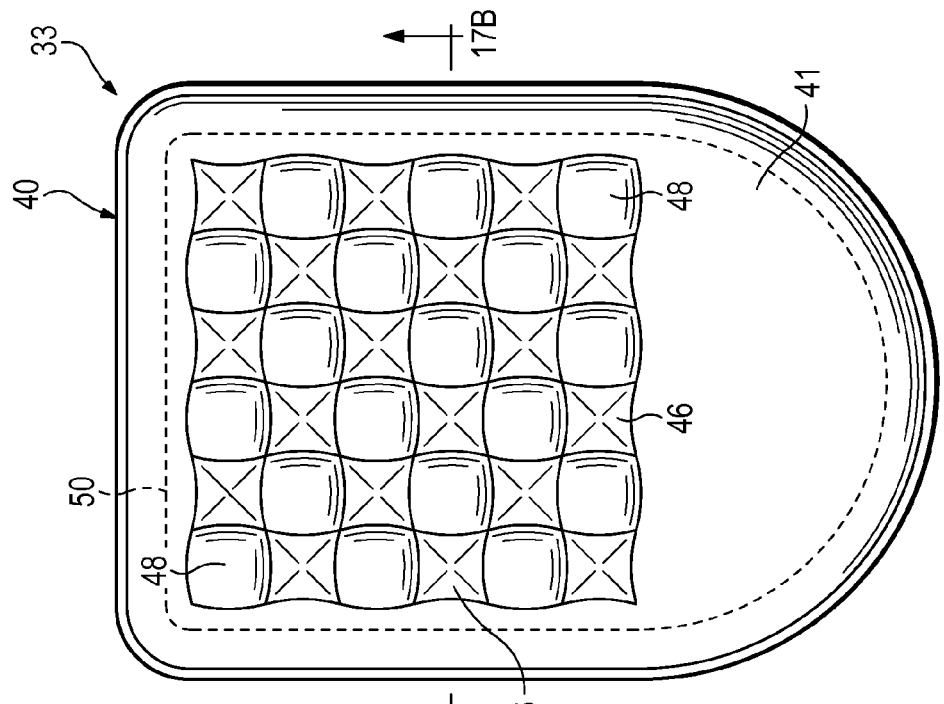
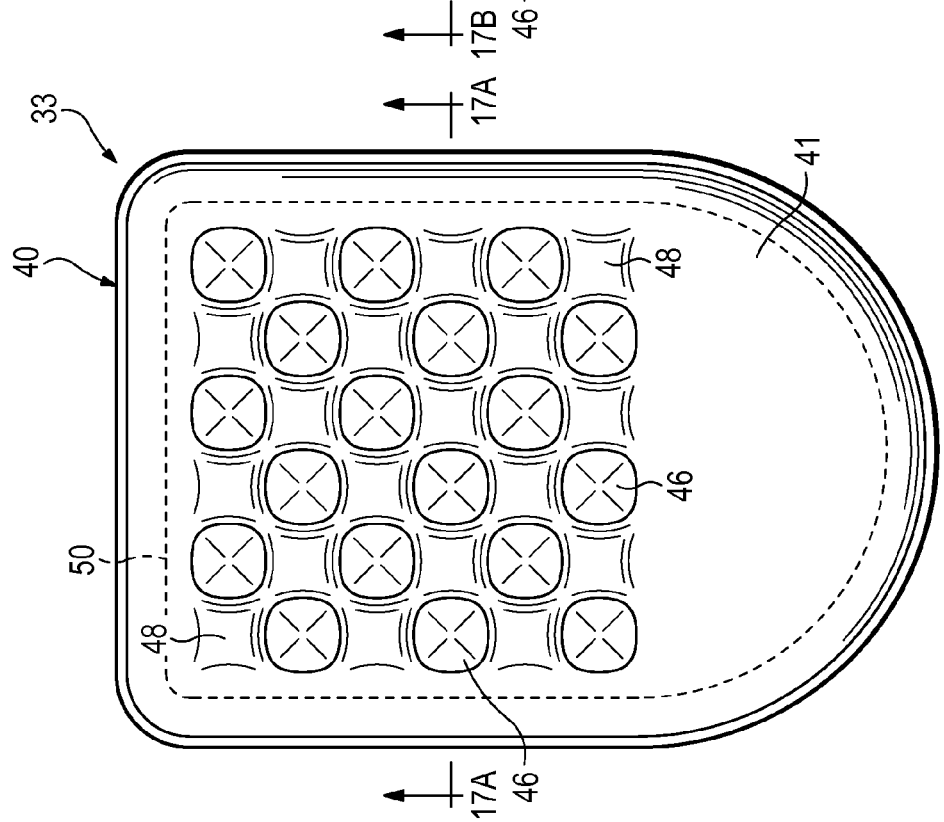

METHOD OF MANUFACTURING A CONTOURED FLUID-FILLED CHAMBER WITH A TENSILE MEMBER

CROSS-REFERENCE TO RELATED APPLICATION(S)

This application is a continuation application of co-pending application Ser. No. 12/778,921 filed May 12, 2010, the disclosure of which is hereby incorporated by reference.

BACKGROUND

Articles of footwear generally include two primary elements, an upper and a sole structure. The upper is formed from a variety of material elements (e.g., textiles, foam, leather, and synthetic leather) that are stitched or adhesively bonded together to form a void on the interior of the footwear for comfortably and securely receiving a foot. An ankle opening through the material elements provides access to the void, thereby facilitating entry and removal of the foot from the void. In addition, a lace is utilized to modify the dimensions of the void and secure the foot within the void.

The sole structure is located adjacent to a lower portion of the upper and is generally positioned between the foot and the ground. In many articles of footwear, including athletic footwear, the sole structure generally incorporates an insole, a midsole, and an outsole. The insole, which may be located within the void and adjacent to a lower surface of the void, is a thin compressible member that enhances footwear comfort. The midsole, which may be secured to a lower surface of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms the ground-contacting portion of the footwear and is usually fashioned from a durable and wear-resistant material that includes texturing to improve traction.

Generally, the midsole is primarily formed from a foamed polymer material, such as polyurethane or ethylvinylacetate, that extends throughout a length and width of the footwear. In some articles of footwear, the midsole may include a variety of additional footwear elements that enhance the comfort or performance of the footwear, including plates, moderators, fluid-filled chambers, lasting elements, or motion control members. In some configurations, any of these additional footwear elements may be located between the midsole and either of the upper and outsole, embedded within the midsole, or encapsulated by the foamed polymer material of the midsole, for example. Although many midsoles are primarily formed from a foamed polymer material, fluid-filled chambers or other non-foam structures may form a majority of some midsole configurations.

Various techniques may be utilized to form fluid-filled chambers for articles of footwear or other products, including a two-film technique, a thermoforming technique, and a blowmolding technique, for example. In the two-film technique, two separate polymer sheets are bonded together at specific locations. The thermoforming technique is similar to the two-film technique in that two polymer sheets are bonded together, but also includes utilizing a heated mold to form or otherwise shape the polymer sheets. In the blow-molding technique, a parison formed from a molten or otherwise softened polymer material is placed within a mold having a cavity with the desired configuration of the chamber. Pressurized air induces the polymer material to conform to surfaces of the cavity. The polymer material then cools and retains the shape of the cavity, thereby forming the chamber.

Following each of the techniques discussed above, the chambers are pressurized. That is, a pressurized fluid is injected into the chambers and then sealed within the chambers. One method of pressurization involves forming inflation conduits in residual portions of the polymer sheets or the parison. In order to pressurize the chambers, the fluid is injected through the inflation conduits, which are then sealed. The residual portions of the polymer sheets or the parison, including the inflation conduits, are then trimmed or otherwise removed to substantially complete manufacture of the chambers.

SUMMARY

Various methods of manufacturing fluid-filled chambers, which may be incorporated into articles of footwear and other products, are disclosed below. One exemplary method comprises steps of locating, pressing, joining, and pressurizing. In one step, the method includes locating a tensile member between a first polymer sheet and a second polymer sheet, the tensile member having a first layer, an opposite second layer, and a plurality of connecting members. In another step, the method includes pressing the first polymer sheet against the first layer and the second polymer sheet against the second layer to form (a) a plurality of indentations in the first polymer sheet in the configuration of a first regularly repeating pattern and (b) a plurality of indentations in the second polymer sheet in the configuration of a second regularly repeating pattern, the first regularly repeating pattern being offset from the second regularly repeating pattern. In another step, the method includes joining the first polymer sheet and the second polymer sheet to form a peripheral bond and thereby form a chamber. In another step, the method includes pressurizing the chamber to place the connecting members in tension.

Another exemplary method comprises steps of locating, positioning, compressing, and joining. In one step, the method includes locating a first polymer sheet and a second polymer sheet between a first mold portion and a second mold portion, the first mold portion having a plurality of convex areas in a first regularly repeating pattern aligned to a first grid, and the second mold portion having a plurality of convex areas in a second regularly repeating pattern aligned to a second grid. In another step, the method includes positioning a tensile member between a first polymer sheet and a second polymer sheet, the tensile member being a spacer textile and having a first layer, a second layer, and at least one connecting member. In another step, the method includes compressing the first polymer sheet, the tensile member, and the second polymer sheet between the first mold portion and the second mold portion. In another step, the method includes joining the first polymer sheet and the second polymer sheet to form a peripheral bond.

A further exemplary method comprises steps of providing, locating, positioning, compressing, and bonding. In one step, the method includes providing a mold having a first mold portion and a second mold portion, the first mold portion having a plurality of protrusions aligned to a first grid, and the second mold portion having a plurality of protrusions aligned to a second grid. In another step, the method includes locating a first polymer sheet, a second polymer sheet, and a tensile member between the first mold portion and the second mold portion, the first polymer sheet being positioned adjacent to the first mold portion, the second polymer sheet being positioned adjacent to the second mold portion, and the tensile member being positioned between the first polymer sheet and the second polymer sheet. In another step, the method includes positioning the first mold portion and the second mold portion such that the first grid is offset from the second grid. In another step, the method includes compressing the first polymer sheet, the second polymer sheet, and the tensile member between the first mold portion and the second mold portion to (a) bond the first polymer sheet to the tensile member, (b) bond the second polymer sheet to the tensile member. In another step, the method includes bonding the first polymer sheet to the second polymer sheet around at least a portion of a periphery of the tensile member.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

BRIEF DESCRIPTION OF THE DRAWINGS

The foregoing Summary and the following Detailed Description will be better understood when read in conjunction with the accompanying figures.

FIG. 4 is an exploded perspective view of the chamber.

FIG. 5 is a top plan view of the chamber.

FIG. 6 is a bottom plan view of the chamber.

FIG. 10 is a perspective view of a first mold that may be utilized in a first process for manufacturing the chamber.

FIGS. 16A-16D are top plan views corresponding with FIG. 5 and depicting additional configurations of the chamber.

DETAILED DESCRIPTION

The following discussion and accompanying figures disclose various configurations of fluid-filled chambers and methods for manufacturing the chambers. Although the chambers are disclosed with reference to footwear having a configuration that is suitable for running, concepts associated with the chambers may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chambers may also be utilized with footwear styles that are generally considered to be non-athletic, including dress shoes, loafers, and sandals. In addition to footwear, the chambers may be incorporated into other types of apparel and athletic equipment, including helmets, gloves, and protective padding for sports such as football and hockey. Similar chambers may also be incorporated into cushions and other compressible structures utilized in household goods and industrial products. Accordingly, chambers incorporating the concepts disclosed herein may be utilized with a variety of products.

General Footwear Structure

Figure 1:
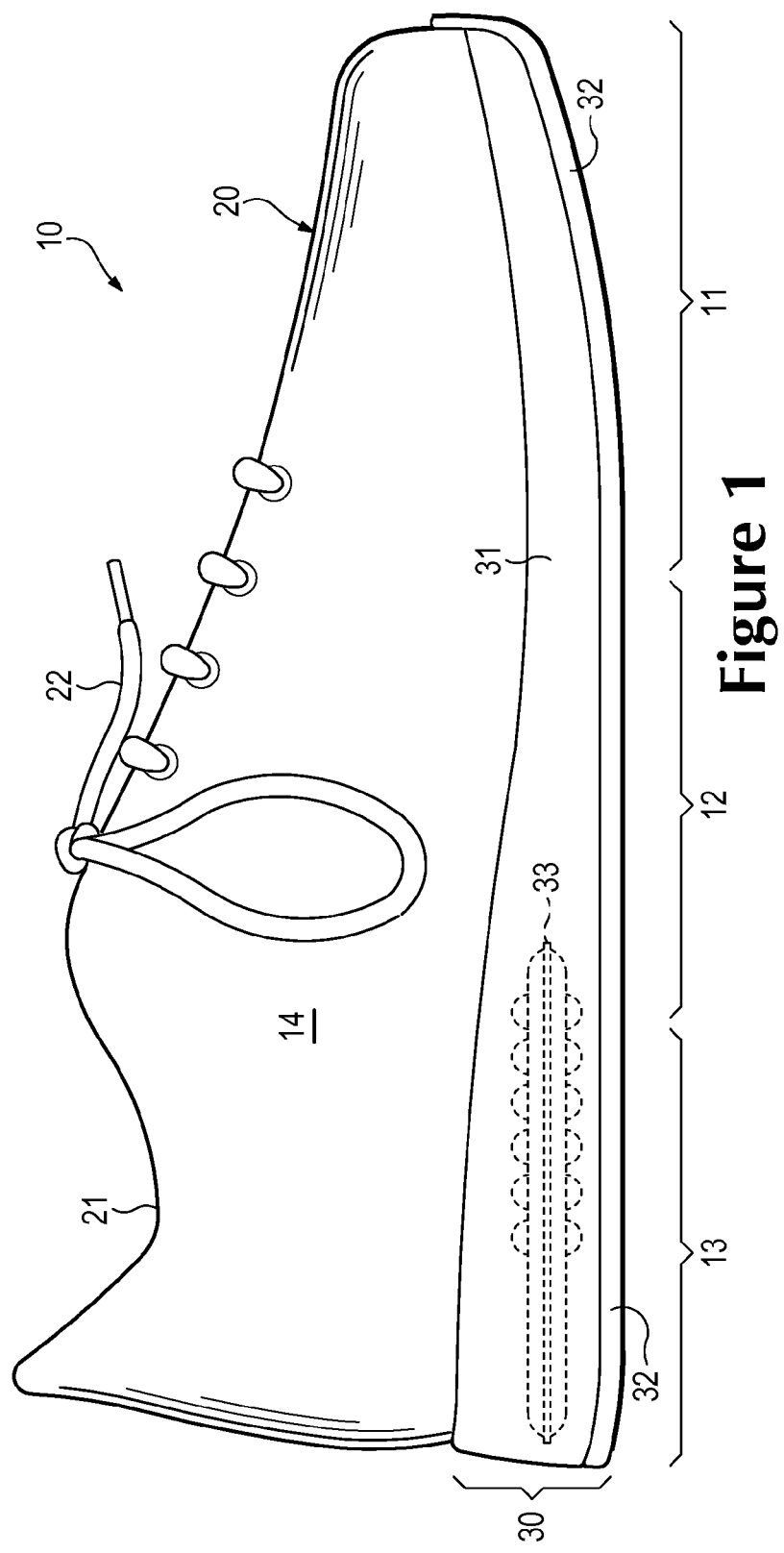
FIG. 1 is a lateral side elevational view of an article of footwear incorporating a fluid-filled chamber.
Figure 2:
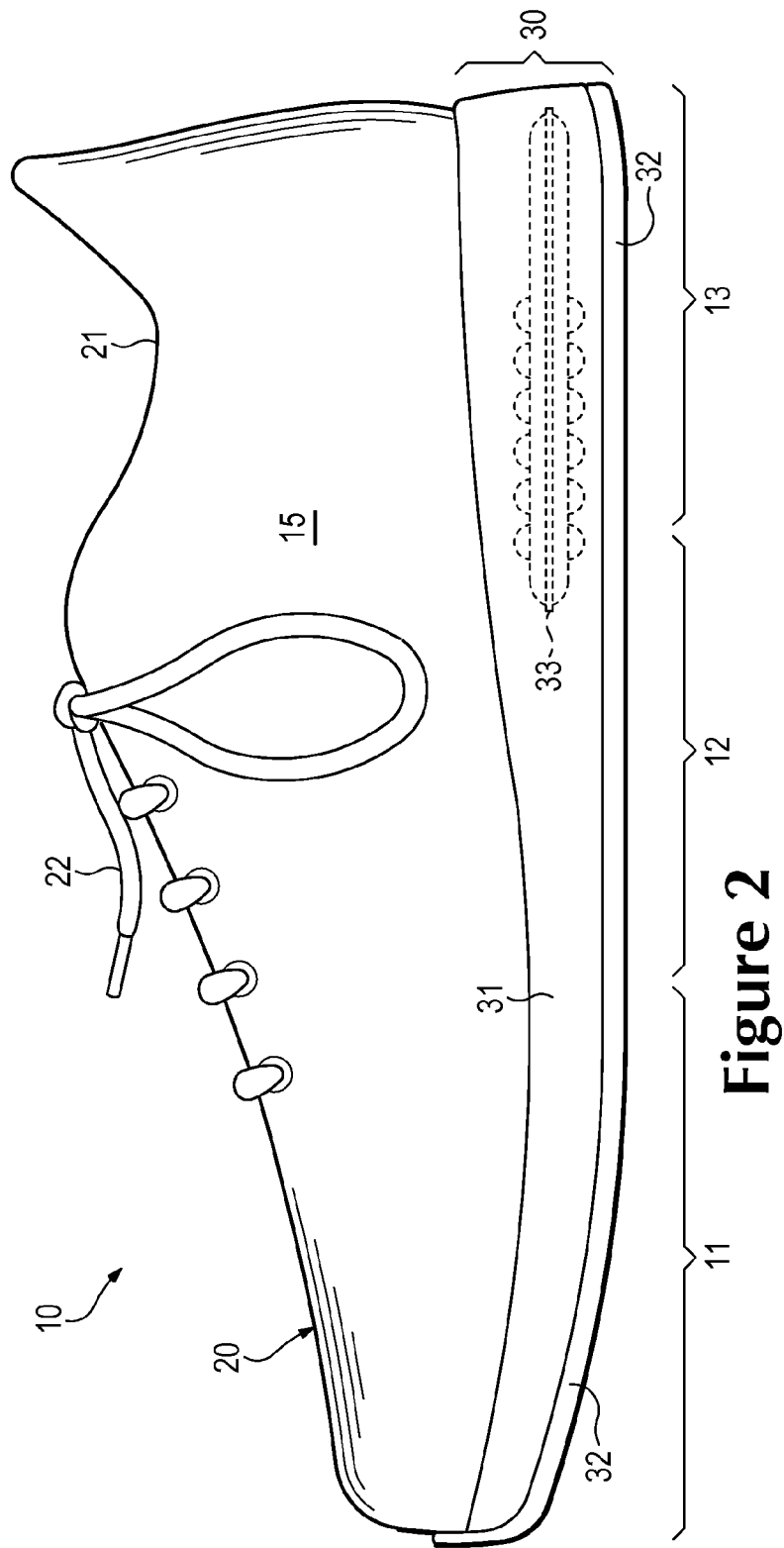
FIG. 2 is a medial side elevational view of the article of footwear.
Figure 3:
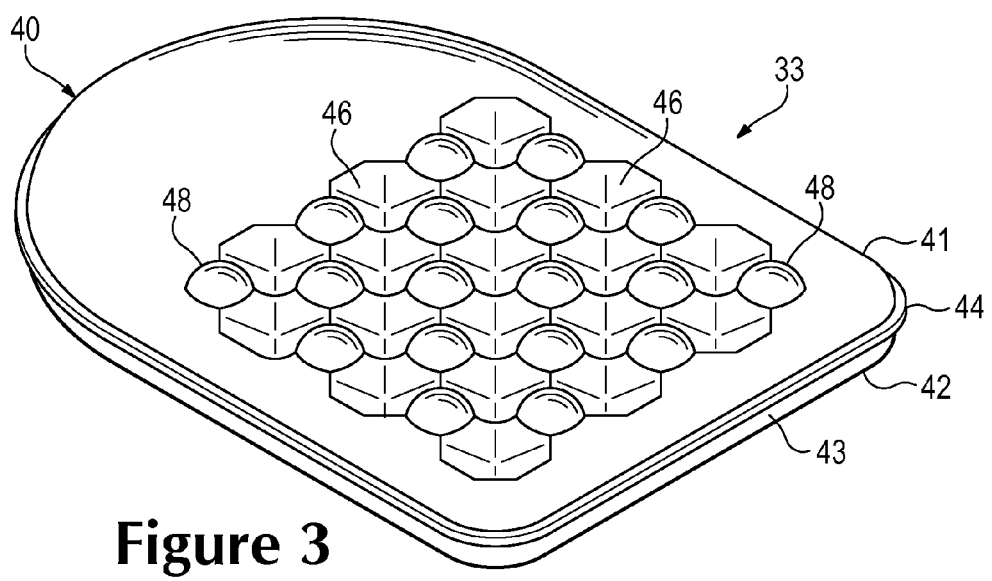
FIG. 3 is a perspective view of the chamber.
Figure 7:
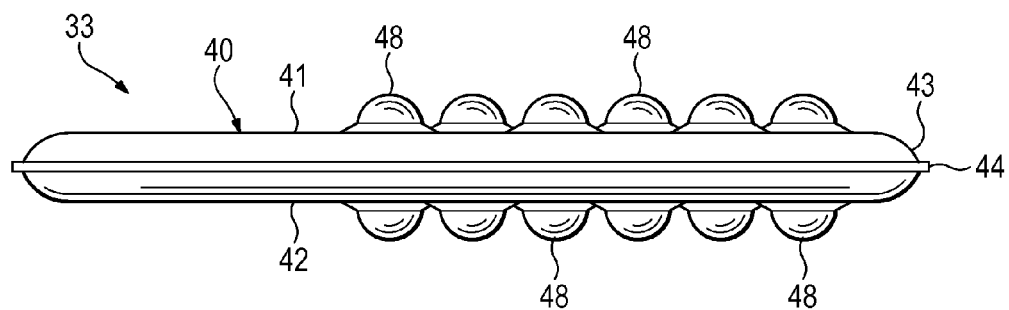
FIG. 7 is a lateral side elevational view of the chamber.
Figure 8:
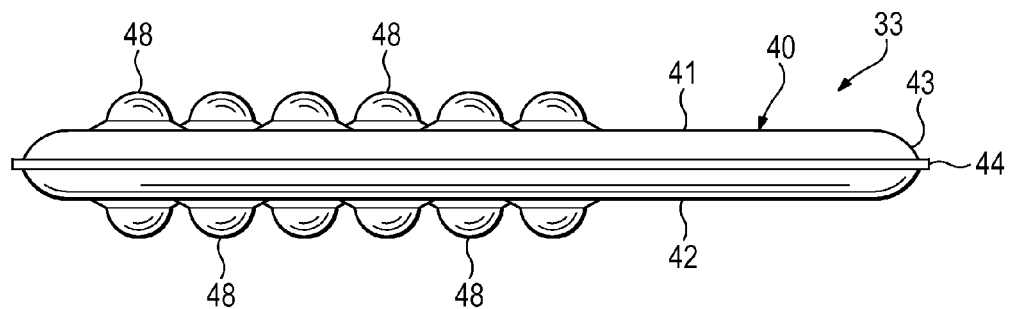
FIG. 8 is a medial side elevational view of the chamber.

An article of footwear 10 is depicted in FIGS. 1 and 2 as including an upper 20 and a sole structure 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of a foot. Heel region 13 generally includes portions of footwear 10 corresponding with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11- 13 and sides 14-15 are intended to represent general areas of footwear 10 to aid in the following discussion. In addition to footwear 10, regions 11-13 and sides 14-15 may also be discussed with respect to the individual elements thereof, such as upper 20 and sole structure 30, and to the foot itself.

Upper 20 is depicted as having a substantially conventional configuration incorporating a plurality of material elements (e.g., textile, foam, leather, and synthetic leather) that are stitched or adhesively bonded together to form an interior void for securely and comfortably receiving the foot. The material elements may be selected and located with respect to upper 20 in order to selectively impart properties of durability, air-permeability, wear-resistance, flexibility, and comfort, for example. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Given that various aspects of the present application primarily relate to sole structure 30, upper 20 may exhibit the general configuration discussed above or the general configuration of practically any other conventional or nonconventional upper. Accordingly, the overall structure of upper 20 may vary significantly.

Sole structure 30 is secured to upper 20 and has a configuration that extends between upper 20 and the ground. In effect, therefore, sole structure 30 is located to extend between the foot and the ground. In addition to attenuating ground reaction forces (i.e., providing cushioning for the foot), sole structure 30 may provide traction, impart stability, and limit various foot motions, such as pronation.

The primary elements of sole structure 30 are a midsole 31 and an outsole 32. Midsole 31 may be formed from a polymer foam material, such as polyurethane or ethylvinylacetate, that encapsulates a fluid-filled chamber 33. In addition to the polymer foam material and chamber 33, midsole 31 may incorporate one or more additional footwear elements that enhance the comfort, performance, or ground reaction force attenuation properties of footwear 10, including plates, moderators, lasting elements, or motion control members. Outsole 32, which may be absent in some configurations of footwear 10, is secured to a lower surface of midsole 31 and may be formed from a rubber material that provides a durable and wear-resistant surface for engaging the ground. In addition, outsole 32 may also be textured to enhance the traction (i.e., friction) properties between footwear 10 and the ground. Sole structure 30 may also incorporate an insole or sockliner that is located with in the void in upper 20 and adjacent a plantar (i.e., lower) surface of the foot to enhance the comfort of footwear 10.

Chamber Configuration

Chamber 33 is depicted individually in FIGS. 3-9C in an initial configuration that is suitable for footwear applications. Chamber 33 has a substantially flat configuration, and when incorporated into footwear 10, chamber 33 corresponds with heel region 13 of midsole 31. Although the polymer foam material of midsole 31 is depicted as forming a sidewall of midsole 31, chamber 33 may be exposed on either or both of sides 14-15 to form a portion of the sidewall in some configurations of footwear 10. When the foot is located within upper 20, chamber 33 extends under a heel area of the foot in order to attenuate ground reaction forces that are generated when sole structure 30 is compressed between the foot and the ground during various ambulatory activities, such as running and walking. In other configurations, chamber 33 may have an alternate extent, such as extending under a forefoot area of the foot, or extending under substantially all of the foot.

The primary elements of chamber 33 are a barrier 40 and a tensile member 50. Barrier 40 (a) forms an exterior of chamber 33, (b) defines an interior void that receives both a pressurized fluid and tensile member 50, and (c) provides a durable sealed barrier for retaining the pressurized fluid within chamber 33. The polymer material of barrier 40 includes an upper barrier portion 41 oriented toward upper 20, an opposite lower barrier portion 42 oriented toward outsole 32, and a sidewall barrier portion 43 that extends around a periphery of chamber 33 and between barrier portions 41 and 42. Tensile member 50 is located within the interior void and includes an upper tensile layer 51, an opposite lower tensile layer 52, and a plurality of connecting members 53 that extend between tensile layers 51 and 52. Upper tensile layer 51 is secured to an inner surface of upper barrier portion 41, and lower tensile layer 52 is secured to an inner surface of lower barrier portion 42. Although discussed in greater detail below, either adhesive bonding or thermobonding may be utilized to secure tensile member 50 to barrier 40.

A variety of processes, two of which are discussed in greater detail below, may be utilized to manufacture chamber 33. In general, the manufacturing processes involve (a) securing a pair of polymer sheets, which form barrier portions 41-43, to opposite sides of tensile member 50 (i.e., to tensile layers 51 and 52) and (b) forming a peripheral bond 44 that joins a periphery of the polymer sheets and may extend around sidewall barrier portion 43. A fluid may then be injected into the interior void and pressurized. The pressurized fluid exerts an outward force upon barrier 40, which tends to separate barrier portions 41 and 42. Tensile member 50, however, is secured to each of barrier portions 41 and 42 in order to retain the intended shape of chamber 33 when pressurized. More particularly, connecting members 53 extending across the interior void are placed in tension by the outward force of the pressurized fluid upon barrier 40, thereby preventing barrier 40 from expanding outward and causing chamber 33 to retain an intended shape. Whereas peripheral bond 44 joins the polymer sheets to form a seal that prevents the fluid from escaping, tensile member 50 prevents barrier 40 from expanding outward or otherwise distending due to the pressure of the fluid. That is, tensile member 50 effectively limits the expansion of chamber 33 to retain an intended shape of barrier portions 41 and 42. Suitably configured, tensile member 50 may have any of a range of configurations, including the range of configurations disclosed in U.S. patent application Ser. No. 12/123,612 to Dua, U.S. patent application Ser. No. 12/123,646 to Rapaport, et al., and U.S. patent application Ser. No. 12/630,642 to Peyton.

Furthermore, both upper barrier portion 41 and lower barrier portion 42 are formed to include first areas 46 and second areas 48. As discussed in greater detail below, first areas 46 may be indented areas extending into chamber 33 and second areas 48 may be protruding areas extending outward from chamber 33. By forming barrier 40 to include first areas 46 and second areas 48, one or more properties of chamber 33 may be altered, such as a flexibility, stiffness, rigidity, tensile response, compressibility, or force attenuation property of chamber 33. First areas 46 and second areas 48 may also enhance an aesthetic quality of chamber 33, such as the appearance or feel of chamber 33. Additionally, forming barrier 40 to include first areas 46 and second areas 48 may alter a distribution of the cushioning properties of chamber 33.

The fluid within chamber 33 may be pressurized between zero and three hundred fifty kilopascals (i.e., approximately fifty-one pounds per square inch) or more. In addition to air and nitrogen, the fluid may include any of the gasses disclosed in U.S. Pat. No. 4,340,626 to Rudy. In some configurations, chamber 33 may incorporate a valve or other structure that permits the individual to adjust the pressure of the fluid. Additionally, chamber 33 may be incorporated into a fluid system, similar to a fluid system disclosed in U.S. Pat. No. 7,409,779 to Dojan, et al., that varies the pressure within barrier 40 depending upon, for example, the running style or weight of the wearer.

A wide range of polymer materials may be utilized for barrier 40. In selecting materials for barrier 40, engineering properties of the material (e.g., tensile strength, stretch properties, fatigue characteristics, dynamic modulus, and loss tangent) as well as the ability of the material to prevent the diffusion of the fluid contained by barrier 40 may be considered. When formed of thermoplastic urethane, for example, barrier 40 may have a thickness of approximately 1.0 millimeter, but the thickness may range from 0.25 to 2.0 millimeters or more, for example. In addition to thermoplastic urethane, examples of polymer materials that may be suitable for barrier 40 include polyurethane, polyester, polyester polyurethane, and polyether polyurethane. Barrier 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for barrier 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

In order to facilitate bonding between tensile member 50 and barrier 40, polymer supplemental layers may be applied to each of tensile layers 51 and 52. When heated, the supplemental layers soften, melt, or otherwise begin to change state so that contact with barrier portions 41 and 42 induces material from each of barrier 40 and the supplemental layers to intermingle or otherwise join with each other. Upon cooling, therefore, the supplemental layer is permanently joined with barrier 40, thereby joining tensile member 50 with barrier 40. In some configurations, thermoplastic threads or strips may be present within tensile layers 51 and 52 to facilitate bonding with barrier 40, as disclosed in U.S. Pat. No. 7,070,845 to Thomas, et al., or an adhesive may be utilized to secure barrier 40 and tensile member 50.

First Area and Second Area Configuration

During the manufacturing processes, energy (e.g., in the form of radio frequency energy or heat) and pressure may alter the structure of tensile member 50 to impart contouring. That is, the energy and pressure may alter the effective lengths of connecting members 53. More particularly, an energy, a pressure, or both may (a) deform a portion of connecting members 53 or (b) induce polymer material from barrier 40 or the supplemental layers to infiltrate tensile member 50, thereby effectively shortening the length of connecting members 53. Depending upon the degree of energy and pressure applied, connecting members 53 may be effectively shortened through both deformation and infiltration of the polymer material.

As depicted in FIGS. 3-9C, both upper barrier portion 41 and lower barrier portion 42 are formed to include a plurality of first areas 46 in a square region of barrier portions 41 and 42. First areas 46 may be indentations extending into chamber 33. Accordingly, first areas 46 may be indented areas of upper barrier portion 41, lower barrier portion 42, or both. At least a portion of first areas 46 of upper barrier portion 41 may be secured to upper tensile layer 51. As well, at least a portion of first areas 46 of lower barrier portion 42 may be secured to lower tensile layer 52. Portions of connecting members 53 that are adjacent to or aligned with first areas 46 may have a shorter effective length than other connecting members 53 of tensile member 50, which may be due to an applied energy, an applied pressure, or both. Additionally, a contour or shape applied during the manufacturing process to barrier 40 at first areas 46 (by a mold, for example) may contribute to the inward extension of first areas 46.

Similarly, both upper barrier portion 41 and lower barrier portion 42 are also formed to include a plurality of second areas 48. Second areas 48 may be protrusions extending outward from chamber 33. Accordingly, second areas 48 may be protruding areas of either upper barrier portion 41 or lower barrier portion 42. Portions of second areas 48 of upper barrier portion 41 may be unsecured to upper tensile layer 51. As well, portions of second areas 48 of lower barrier portion 42 may be unsecured to lower tensile layer 52. In other words, portions of tensile member 50 adjacent to or aligned with second areas 48 may not extend to portions of second areas 48. An outward force exerted upon barrier 40 by the pressurized fluid within barrier 40 may cause portions of second areas 48 to extend outward to a greater degree than areas of barrier 40 to which tensile member 50 is secured. Additionally, a contour or shape applied by mold to barrier 40 at second areas 48 may contribute to the outward extension of second areas 48.

As depicted in FIGS. 4-6 and 9A-9C, first areas 46 of upper barrier portion 41 are positioned opposite from second areas 48 of lower barrier portion 42, and second areas 48 of upper barrier portion 41 are positioned opposite from first areas 46 of lower barrier portion 42. That is, first areas 46 are positioned on chamber 33 substantially opposite from second areas 48.

In some configurations, first areas 46 may be portions of barrier 40 that are bonded or otherwise joined to tensile member 50. Accordingly, first areas 46 may be bonded areas of upper barrier portion 41, lower barrier portion 42, or both. In such configurations, first areas 46 of upper barrier portion 41 may be secured to upper tensile layer 51, whereas first areas 46 of lower barrier portion 42 may be secured to lower tensile layer 52.

Additionally, in such configurations, second areas 48 may be portions of barrier 40 that are not bonded or otherwise joined to tensile member 50. Accordingly, second areas 48 may be unbonded areas of upper barrier portion 41, lower barrier portion 42, or both. In such configurations, second areas 48 of upper barrier portion 41 may be left not secured to upper tensile layer 51, whereas second areas 48 of lower barrier portion 42 may be left not secured to lower tensile layer 52.

In some configurations, portions of first areas 46 may be secured to upper tensile layer 51 or to lower tensile layer 52 in a plurality of regions. In such configurations, an aggregate area of the plurality of regions may exceed half of an entire area of either upper tensile layer 51, lower tensile layer 52, or both. In some configurations, a pattern of first areas 46 and second areas 48 may be aligned with only part of either upper tensile layer 51 or lower tensile layer 52. In such configurations, portions of first areas 46 may be secured to upper tensile layer 51 or lower tensile layer 52 in a plurality of regions, and an aggregate area of the plurality of regions may exceed half of the area of tensile layer 51 or 52 associated with the pattern of first areas 46 and second areas 48.

In some configurations, first areas 46 may be portions of barrier 40 in which barrier 40 contacts tensile member 50. Accordingly, first areas 46 may be contacting areas of upper barrier portion 41, lower barrier portion 42, or both. In such configurations, first areas 46 of upper barrier portion 41 may be immediately adjacent to or in contact with upper tensile layer 51, whereas first areas 46 of lower barrier portion 42 may be immediately adjacent to or in contact with lower tensile layer 52.

Additionally, in such configurations, second areas 48 may be portions of barrier 40 that are spaced from tensile member 50. Accordingly, second areas 48 may be spaced areas of upper barrier portion 41, lower barrier portion 42, or both. In such configurations, second areas 48 of upper barrier portion 41 may be not immediately adjacent to or in contact with upper tensile layer 51, or may be otherwise separated from upper tensile layer 51, whereas second areas 48 of lower barrier portion 42 may be not immediately adjacent to or in contact with lower tensile layer 52, or may be otherwise separated from lower tensile layer 52.

Figure 9A:
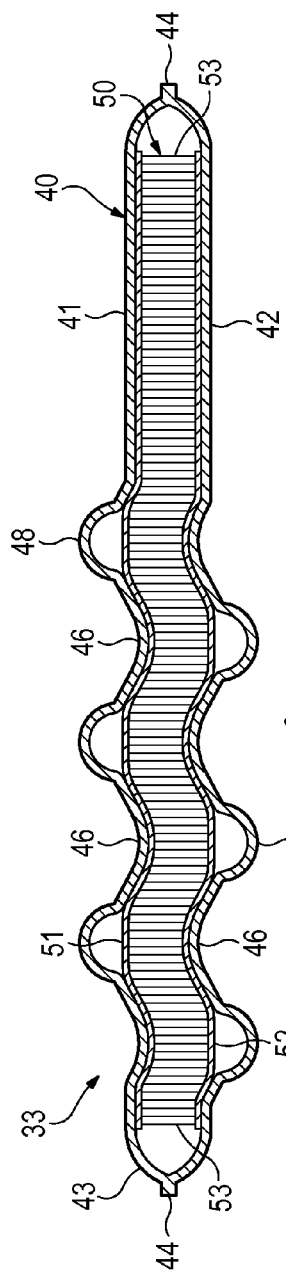
FIGS. 9A-9C are cross-sectional views of the fluid filled chamber, as defined by section lines 9A-9A through 9C-9C in FIG. 5.
Figure 9B:
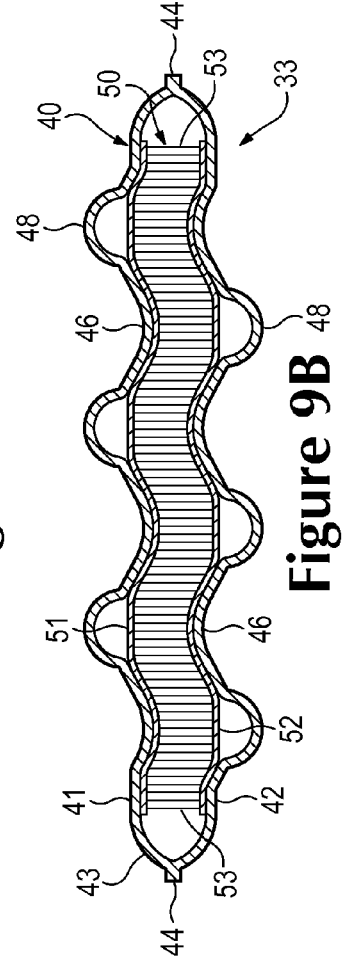
Figure 9C:
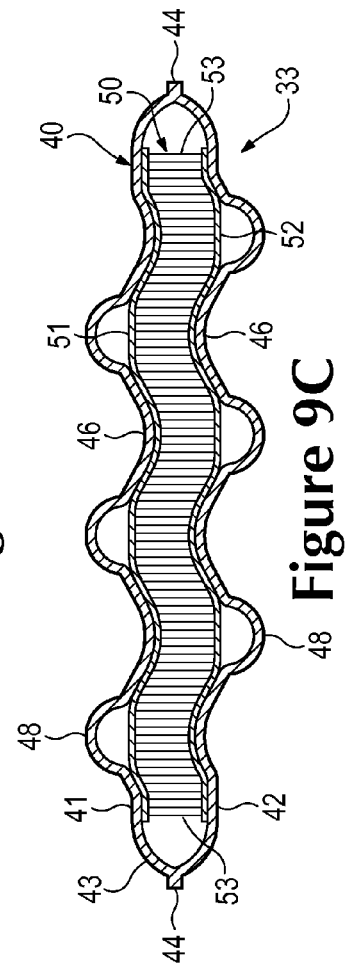

As depicted in FIGS. 9A-9C, one or more regions of upper barrier portion 41 may have first areas 46 and second areas 48 that sinusoidally alternate between extending into chamber 33 and extending outward from chamber 33. This sinusoidal variance may extend in more than one direction across upper barrier portion 41. In other words, first areas 46 of upper barrier portion 41 extending into chamber 33 and second areas 48 of upper barrier portion 41 extending outward from chamber 33 may extend across a surface of upper barrier portion 41 in a manner similar to the surface of an egg crate material. At the same time, one or more regions of an aligned region of lower barrier portion 42 may have second areas 48 positioned opposite first areas 46 of upper barrier portion 41, and may also have first areas 46 positioned opposite second areas 48 of upper barrier portion 41. In turn, first areas 46 and second areas 48 of lower barrier portion 42 may themselves sinusoidally alternate between extending into chamber 33 and extending outward from chamber 33, and may sinusoidally vary in more than one direction across lower barrier portion 42. Accordingly, various regions of chamber 33 may have an undulating cross-sectional configuration.

As depicted in FIGS. 3-6, first areas 46 and second areas 48 of upper barrier portion 41 have a configuration of a tessellation or regularly repeating pattern. More specifically, first areas 46 of upper barrier portion 41 have a substantially octagonal configuration, each being adjacent on four sides with other first areas 46 and adjacent on four other sides with second areas 48. Additionally, first areas 46 form a continuous region in which upper barrier portion 41 is bonded to tensile member 50. At the same time, second areas 48 of upper barrier portion 41 have a substantially square configuration, each being adjacent on four sides with first areas 46. Each of first areas 46 and second areas 48 may also have a variety of other shapes that combine to cover the surfaces of chamber 30. For example, first areas 46 and second areas 48 may have circular shapes, elliptical shapes, elongate shapes, triangular shapes, pentagonal shapes, trapezoidal shapes, or any other regular or irregular shape. In addition, the shapes of first areas 46 and second areas 48 may vary across lower barrier portion 41 and upper barrier portion 42.

The substantially octagonal first areas 46 and substantially square second areas 48 alternate regularly over upper barrier portion 41 in a first regularly repeating pattern. Similarly, first areas 46 of lower barrier portion 42 have a substantially octagonal configuration and second areas 48 of lower barrier portion 42 have a substantially square configuration, and first areas 46 and second areas 48 of lower barrier portion 42 alternate regularly over lower barrier portion 42 in a second regularly repeating pattern. As depicted in FIGS. 5-6, the first regularly repeating pattern is based upon and aligned to a first square grid, and the second regularly repeating pattern is based upon and aligned to a second square grid. Furthermore, as first areas 46 are positioned on chamber 33 substantially opposite from second areas 48, the second regularly repeating pattern has essentially a 180-degree offset or phase difference with respect to the first regularly repeating pattern.

As depicted in FIGS. 4 and 9A-9C, tensile member 50 is a textile tensile member. In some configurations, tensile member 50 has a configuration of a spacer textile that includes an upper tensile layer 51, an opposite lower tensile layer 52, and a plurality of connecting members 53 that extend between tensile layers 51 and 52. In such configurations, lower upper tensile layer 51, lower tensile layer 52, and connecting members 53 may be formed to include textile elements.

First Manufacturing Process

A variety of manufacturing processes may be utilized to form chamber 33. Some manufacturing processes suitable for use in forming chamber 33 may use a first mold 60 as depicted in FIG. 10. For example, a thermoforming process may use first mold 60 to form chamber 33. First mold 60 has an upper mold portion 61 and a lower mold portion 62. Both upper mold portion 61 and lower mold portion 62 have first mold areas 66 and second mold areas 68.

A suitable manufacturing process to use in forming chamber 33 using first mold 60, as depicted in FIGS. 11A-12C, will now be discussed. In general, the process involves (a) forming a precursor to chamber 33 by welding or otherwise joining an upper polymer layer and a lower polymer layer to define an interior void, to position a tensile member 50 within the interior void, and to form a peripheral bond 44 sealing tensile member 50 within the interior void, (b) inflating the precursor to chamber 33, and (c) utilizing a first mold 60 to form chamber 33 by applying to the precursor to chamber 33 at least a first degree of compression with first mold areas 66 and at least a second degree of compression with second mold areas 68, respectively forming first areas 46 and second areas 48 in an upper barrier portion 41, a lower barrier portion 42, or both.

First, prior to the formation of first areas 46 and second areas 48, and separately from utilizing first mold 60, the precursor to chamber 33 is formed, as discussed generally above. A suitable process for forming the precursor to chamber 33 is disclosed, for example, in U.S. patent application Ser. No. 12/123,646 to Rapaport.

Once the precursor to chamber 33 has been formed and inflated, first mold 60 is utilized to compress the precursor to chamber 33 and form first areas 46 and second areas 48 on the precursor to chamber 33. With reference to FIG. 10, first mold 60 is depicted as including an upper mold portion 61 and an opposite lower mold portion 62. Both upper mold portion 61 and lower mold portion 62 have surfaces defining a plurality of first mold areas 66 and a plurality of second mold areas 68. First mold areas 66 may be protrusions extending outward from upper mold portion 61 and lower mold portion 62, and second mold areas 68 may be indentations extending into upper mold portion 61 and lower mold portion 62.

First mold areas 66 of upper mold portion 61 are positioned opposite from second mold areas 68 of lower mold portion 62, and second mold areas 68 of upper mold portion 61 are positioned opposite from first mold areas 66 of lower mold portion 62. That is, first mold areas 66 are positioned on mold portions 61 and 62 substantially opposite from second mold areas 68.

As depicted in FIGS. 10-12C, one or more regions of upper mold portion 61 may have first mold areas 66 and second mold areas 68 that sinusoidally alternate between extending outward from upper mold portion 61 and extending into upper mold portion 61. This sinusoidal variance may extend in more than one direction across upper barrier portion 41. In other words, first mold areas 66 extending outward from upper mold portion 61 and second mold areas 68 extending into upper mold portion 61 may extend across upper mold portion 41 in a manner similar to the surface of an egg crate material. At the same time, one or more aligned regions of lower mold portion 62 may have second mold areas 68 positioned opposite first mold areas 66 of upper mold portion 61, and may also have first mold areas 66 positioned opposite second mold areas 68 of upper mold portion 61.

The surfaces of mold portions 61 and 62 may be defined such that they flushly abut each other across the entirety of the surfaces when first mold 60 is closed. That is, the surfaces of first mold areas 66 and second mold areas 68 may contact and lay against each other at all locations across mold portions 61 and 62 when first mold 60 is closed. Alternatively, first mold areas 66 and second mold areas 68 may be defined such that when first mold 60 is closed, they flushly abut each other at fewer than all locations across mold portions 61 and 62, or only partially flushly abut each other at some or all locations across mold portions 61 and 62, or do not abut each other at all at some or all locations across mold portions 61 and 62. For example, first mold areas 66 and second mold areas 68 may be configured such that, when mold portions 61 and 62 are brought together, there is more space between central regions of first mold areas 66 and second mold areas 68 than between other regions of first mold areas 66 and second mold areas 68. As an alternative example, first mold areas 66 and second mold areas 68 may be configured such that there is less space between the central regions of first mold areas 66 and second mold areas 68 when mold portions 61 and 62 are brought together.

Figure 11A:
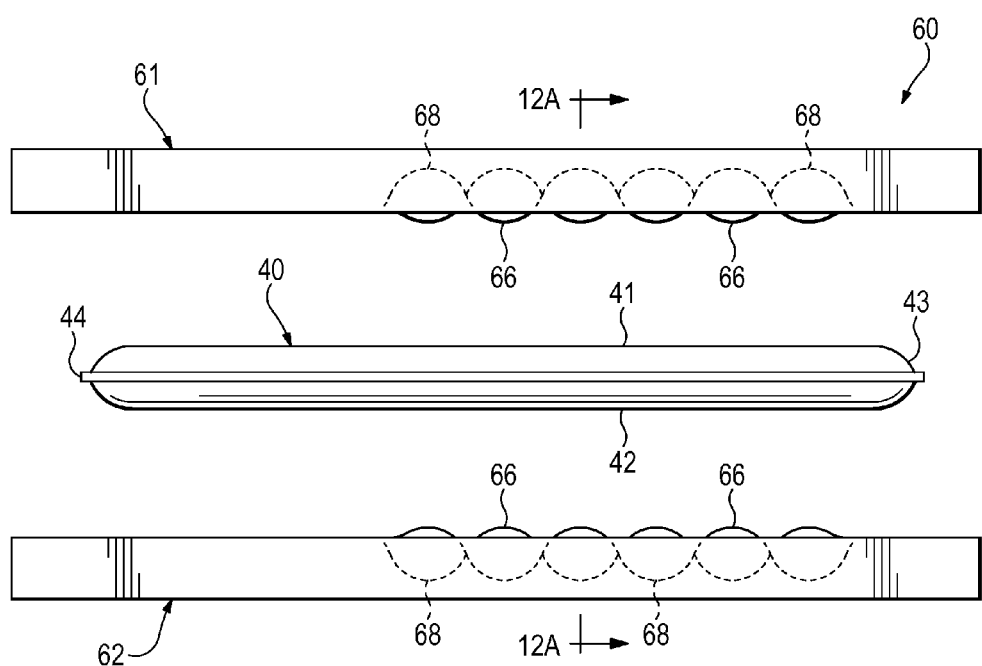
FIGS. 11A-11C are side elevational views of the first mold depicting steps in the first process for manufacturing the chamber.
Figure 12A:
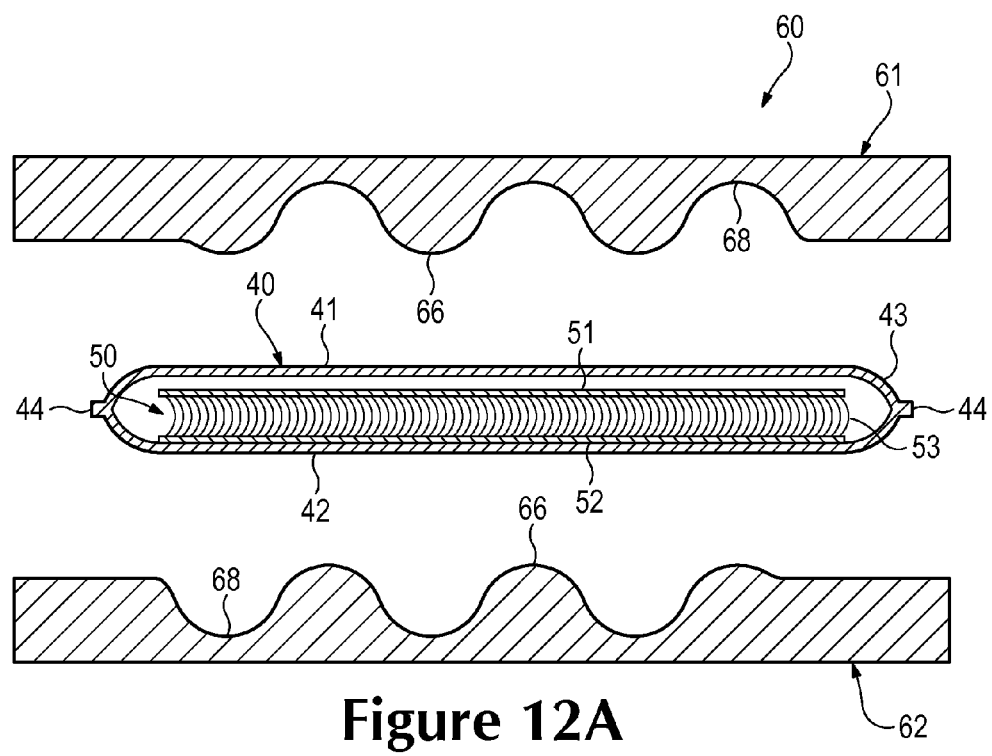
FIGS. 12A-12C are schematic cross-sectional views of the first mold, as defined by section lines 12A-12A through 12C-12C in FIGS. 11A-11C, depicting steps in the first process for manufacturing the chamber.

In utilizing first mold 60, as depicted in FIGS. 11A and 12A, the precursor to chamber 33 is first positioned between upper mold portion 61 and lower mold portion 62. More particularly, upper barrier portion 41 is oriented toward upper mold portion 61, and lower barrier portion 42 is oriented toward lower mold portion 62.

Figure 11B:
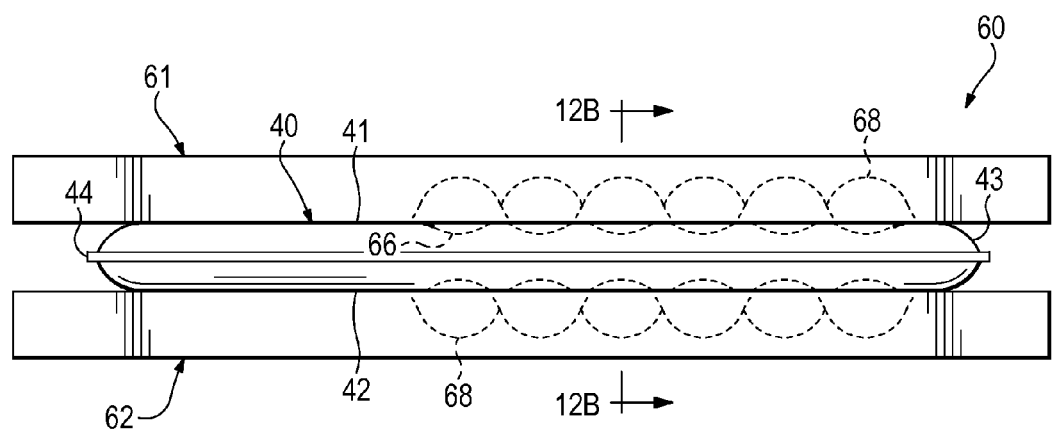

As depicted in FIGS. 11 B and 12B, after the precursor to chamber 33 is positioned, first mold 60 closes such that the precursor to chamber 33 is compressed between upper mold portion 61 and lower mold portion 62. Portions of mold areas 66 and 68 may apply different degrees of compression to upper barrier portion 41 and lower barrier portion 42. That is, areas of barrier portions 41 and 42 may be compressed more by portions of first mold areas 66, and areas of barrier portions 41 and 42 may be compressed less by portions of second mold areas 68.

While the degree of compression applied to barrier portions 41 and 42 by first mold areas 66 may differ from the degree of compression applied to barrier portions 41 and 42 by second mold areas 68, the degree of compression applied by both mold areas 66 and 68 may include a common degree of compression. Mold areas 66 and 68 may be defined to have different shapes or configurations in order to allow mold areas 66 and 68 to apply differing degrees of compression to barrier portions 41 and 42, since mold areas 66 and 68 are defined in surfaces of mold portions 61 and 62. In other words, a common or overall degree of compression associated with the compression applied by mold portions 61 and 62 may be included in the degree of compression applied by both first mold areas 66 and second mold areas 68. Accordingly, differing degrees of pressure may be applied by both first mold areas 66 and second mold areas 68 to the precursor to chamber 33, including a common or overall degree of pressure.

Figure 12B:
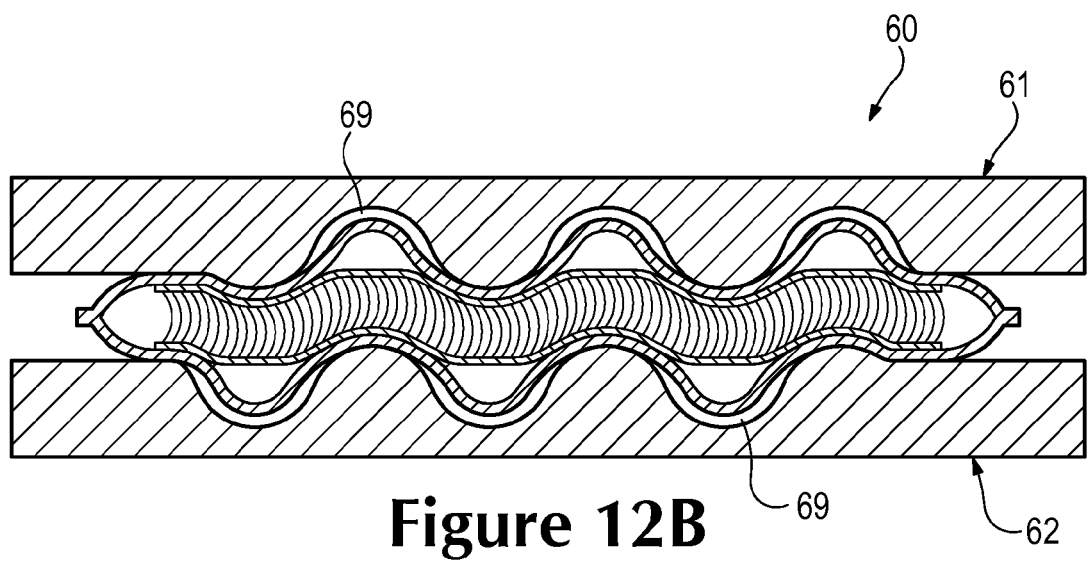

In compressing the precursor to chamber 33, gaps 69 may exist between upper barrier portion 41 and upper mold portion 61, or between lower barrier portion 42 and lower mold portion 42. For example, as depicted in FIG. 12B, gaps 69 exist between upper barrier portion 41 and portions of second mold areas 68 in upper mold portion 61. Similarly, gaps 69 exist between lower barrier portion 42 and portions of second mold areas 68 in lower mold portion 62. The presence, size, or extent of gaps 69 may be configured by the degree of compression applied by second mold areas 68 to the precursor to chamber 33. For example, a common or overall degree of compression applied by mold portions 61 and 62, being included in the degree of compression applied by second mold areas 68, may configure the presence, size, or extent of gaps 69. In turn, the presence, size, or extent of gaps 69 may affect the presence, size, or extent of second areas 48 formed by second mold areas 68.

First mold 60 may be a laminating apparatus. That is, upper mold portion 61 may secure parts of upper barrier portion 41 to upper tensile layer 51. Similarly, lower mold portion 62 may secure parts of lower barrier portion 42 to lower tensile layer 52. While being compressed, radio frequency energy (RF energy, such as heat) may be emitted by first mold 60 in order to heat barrier portions 41 and 42 and tensile member 50. More particularly, radio frequency energy may pass between upper mold portion 61 and lower mold portion 62. The amount of radio frequency energy passing between upper mold portion 61 and lower mold portion 62 at least partially depends upon the spacing between upper mold portion 61 and lower mold portion 62. Given gaps 69 between barrier portions 41 and 42 and second mold areas 68, first areas 46 and second areas 48 may be exposed to differing amounts of radio frequency energy. In addition, as discussed above, first areas 46 and second areas 48 may be exposed to differing amounts of pressure. Accordingly, the presence, extent, or character of the bond between barrier 40 and tensile member 50 may be different between first areas 46 and second areas 48.

More particularly, the compression and heating may induce portions of upper barrier portion 41 to bond with upper tensile layer 51 and may also induce portions of lower barrier portion 42 to bond with lower tensile layer 52. In addition, differences in compression and radio frequency energy due to the configuration of mold areas 66 and 68 may effectively shorten the lengths of some connecting member 53. More particularly, the compression and heating may (a) deform portions of connecting members 53 or (b) induce polymer material from portions of barrier portions 41 or 42 to infiltrate tensile member 50, thereby effectively shortening the lengths of connecting members 53 in the areas where compression and heating are greatest. Depending upon the degree of compression and irradiation, both deformation and infiltration of polymer material may cause the shortening of connecting members 53. Accordingly, compression and irradiation applied at first mold areas 66 and second mold areas 68 may effectively impart the configuration of first areas 46 and second areas 48 to tensile member 50 and chamber 33.

In some configurations, first mold areas 66 and second mold areas 68 may compress different portions of barrier 40 to different degrees. Portions of more-compressed areas of upper barrier portion 41 may be compressed to a first degree of pressure by first mold areas 66 of upper mold portion 61. At the same time, portions of less-compressed areas of upper barrier portion 41 may be compressed to a second degree of pressure by second mold areas 68 of upper mold portion 61, the first degree of pressure being greater than the second degree of pressure. Similarly, portions of more-compressed areas of lower barrier portion 42 may be compressed to a third degree of pressure by first mold areas 66 of lower mold portion 62. At the same time, portions of less-compressed areas of lower barrier portion 42 may be compressed to a fourth degree of pressure by second mold areas 68 of lower mold portion 62, the third degree of pressure being greater than the fourth degree of pressure. In turn, the difference in the degrees of pressure applied by first mold areas 66 and second mold areas 68 to upper barrier portion 41 may itself be different from the difference in the degrees of pressure applied by first mold areas 66 and second mold areas 68 to lower barrier portion 42.

In some configurations, first mold areas 66 and second mold areas 68 may have different extents relative to mold portions 61 and 62, either into or outward from mold portions 61 and 62. Portions of first mold areas 66 may have a convex configuration, extending outward from mold portions 61 and 62. Accordingly, first mold areas 66 may be convex areas of upper mold portion 61, lower mold portion 62, or both. At the same time, in such configurations, portions of second mold areas 68 may have a concave configuration, extending into mold portions 61 and 62. Accordingly, second mold areas 68 may be concave areas of upper mold portion 61, lower mold portion 62, or both.

First mold areas 66 and second mold areas 68 of upper mold portion 61 have a configuration of a tessellation or regularly repeating pattern. Similarly, first mold areas 66 and second mold areas 68 of lower mold portion 62 have a configuration of a tessellation or regularly repeating pattern. As depicted in FIG. 10, first mold areas 66 and second mold areas 68 alternate regularly over upper mold portion 61 in a first regularly repeating pattern. Similarly, first mold areas 66 and second mold areas 68 alternate regularly over lower mold portion 62 in a second regularly repeating pattern. In the first example manufacturing process, the first regularly repeating pattern is based upon and aligned to a first square grid, and the second regularly repeating pattern is based upon and aligned to a second square grid. Furthermore, as first mold areas 66 are positioned on mold 60 substantially opposite from second mold areas 68, the second regularly repeating pattern has essentially a 180-degree offset or phase difference with respect to the first regularly repeating pattern.

At least a portion of upper polymer barrier 41 aligned with first mold areas 66 may be secured to upper tensile layer 51, while at least a portion of upper polymer barrier 41 aligned with second mold areas 68 may be unsecured to upper tensile layer 51. Similarly, at least a portion of lower polymer barrier 42 aligned with first mold areas 66 may be secured to lower tensile layer 52, while at least a portion of lower polymer barrier 42 aligned with second mold areas 68 may be unsecured to lower tensile barrier 52. Accordingly, in some configurations, at least a portion of each more-compressed area of upper barrier portion 41 may be secured to upper tensile layer 51. Similarly, at least a portion of each more-compressed area of lower barrier portion 42 may be secured to lower tensile layer 52.

In some configurations, a plurality of bonded areas may be formed in barrier portions 41 and 42 by a compression of first mold 60. In such configurations, at least a portion of each of the bonded areas of upper barrier portion 41 may be an indentation extending into upper barrier portion 41. Similarly, at least a portion of each of the bonded areas of lower barrier portion 42 may be an indentation extending into lower tensile layer 52.

In some configurations, a plurality of unbonded areas may be formed in barrier portions 41 and 42 by a compression of first mold 60. In such configurations, at least a portion of each of the unbonded areas of upper barrier portion 41 may be a protrusion extending outward from upper barrier portion 41. Similarly, at least a portion of each of the unbonded areas of lower barrier portion 42 may be a protrusion extending outward from lower barrier portion 42.

In some configurations, first mold areas 66 may be protrusions extending outward from mold portions 61 and 62, and may contact barrier portions 41 and 42 to impart a configuration to first areas 46 of indentations extending into chamber 33. As well, second mold areas 68 may be indentations extending into mold portions 61 and 62, and may be positioned adjacent to barrier portions 41 and 42 to impart a configuration to second areas 48 of protrusions extending outward from chamber 33.

Figure 11C:
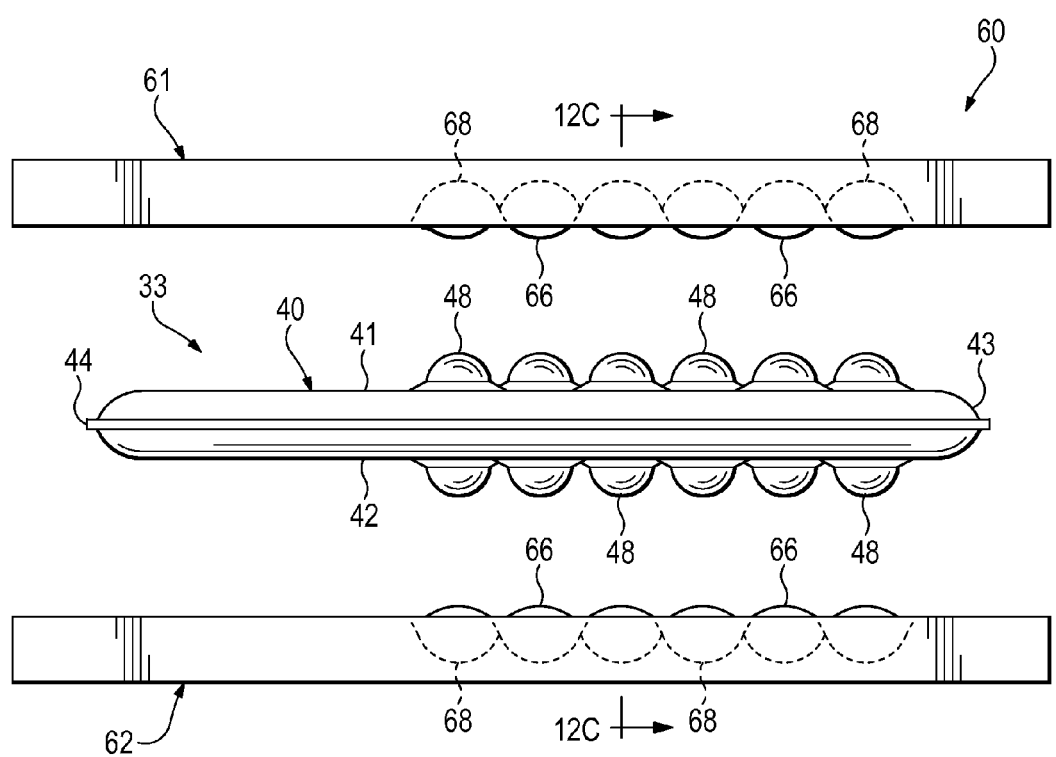
Figure 12C:
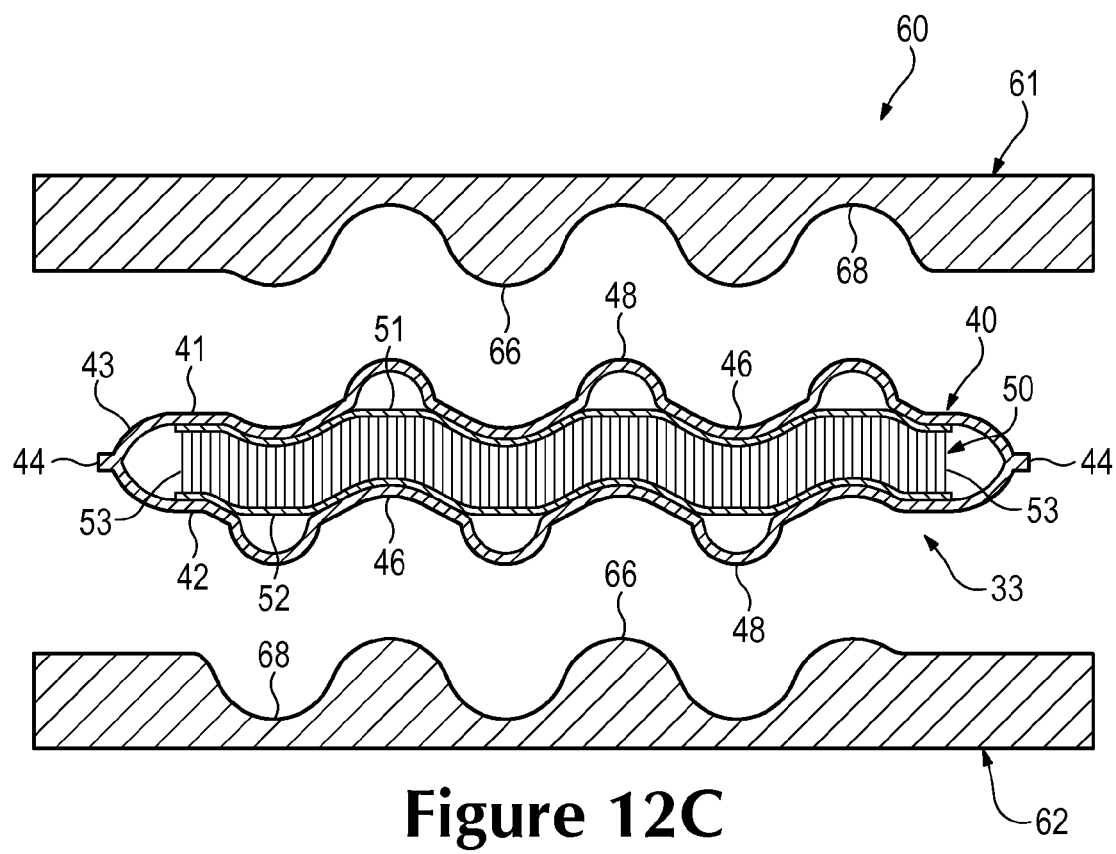

As depicted in FIGS. 11C and 12C, after compressing the precursor to chamber 33, first mold 60 opens, having formed first areas 46 and second areas 48 in barrier portions 41 and 42 of chamber 33. First areas 46 may be formed in parts of barrier portions 41 and 42 compressed by first mold areas 66. Similarly, second areas 48 may be formed in parts of barrier portions 41 and 42 compressed by second mold areas 68. Accordingly, chamber 33 may be formed by forming first areas 46 and second areas 48 in the precursor to chamber 33.

In the manufacturing process described above, a peripheral bond in a precursor to chamber 33 is formed, then the precursor to chamber 33 is inflated, then first areas 46 and second areas 48 are created in the precursor to chamber 33 through a compression step to form chamber 33. As an alternative, first areas 46 and second areas 48 may be created in an upper polymer layer and a lower polymer layer through a compression step, a peripheral bond may then be formed to define chamber 33, and chamber 33 may then be inflated. As a further alternative, a peripheral bond may be formed in a precursor to chamber 33, first areas 46 and second areas 48 may then be created in the precursor to chamber 33 through a compression step to form chamber 33, and chamber 33 may then be inflated. In other words, in various embodiments, the steps in the manufacturing process described above may be performed in any order.

Second Manufacturing Process

Figure 13:
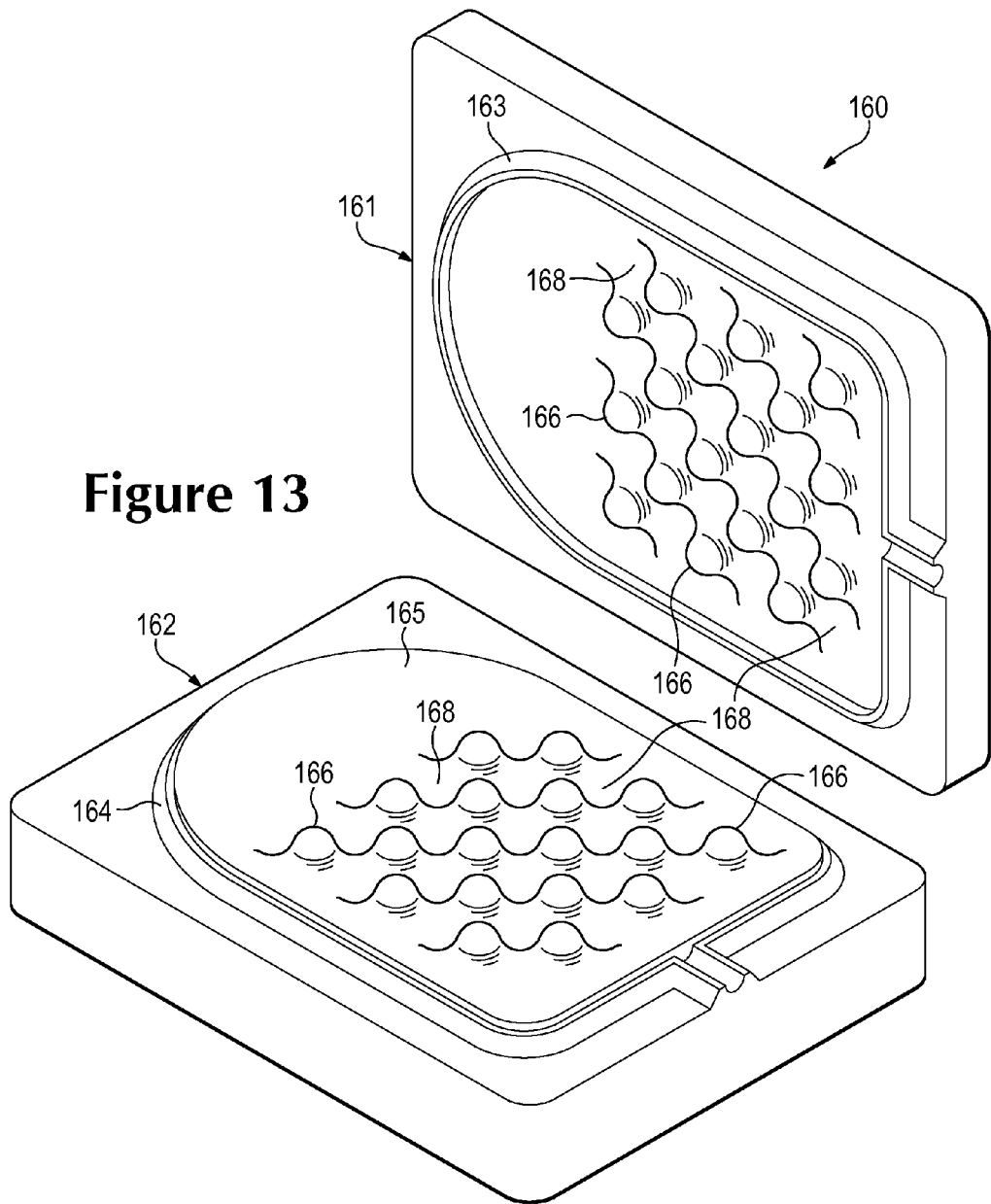
FIG. 13 is a perspective view of a second mold that may be utilized in a second process for manufacturing the chamber.

Other manufacturing processes suitable for forming chamber 33 may use a second mold 160 as depicted in FIG. 13. For example, a thermoforming process may use second mold 160 to form chamber 33. Second mold 160 has an upper mold portion 161 and a lower mold portion 162. Upper mold portion 161 has an upper ridge 163. Lower mold portion 162 has a lower ridge 164 and a movable insert 165. Both upper mold portion 161 and movable insert 165 have first mold areas 166 and second mold areas 168.

A suitable manufacturing process to use in forming chamber 33 using second mold 160, as depicted in FIGS. 14A-15D, will now be discussed. In general, the process involves utilizing a second mold 160 to (a) bond tensile member 50 to each of polymer layers 171 and 172, (b) shape polymer layers 171 and 172, and (c) form a peripheral bond between polymer layers 171 and 172.

Initially, the components of chamber 33, i.e., one or more of tensile member 50 and polymer layers 171 and 172, are heated to a temperature that facilitates bonding between the components. The specific materials utilized for tensile member 50 and polymer layers 171 and 172, which form barrier 40, and the specific temperatures they are heated to may be any materials and temperatures suitable in the art to facilitate bonding. Various radiant heaters, radio frequency heaters, or other devices may be utilized to heat the components of chamber 33. In some manufacturing processes, second mold 160 may be heated such that contact between second mold 160 and the components of chamber 33 raises the temperature of the components to a level that facilitates bonding.

Figure 14A:
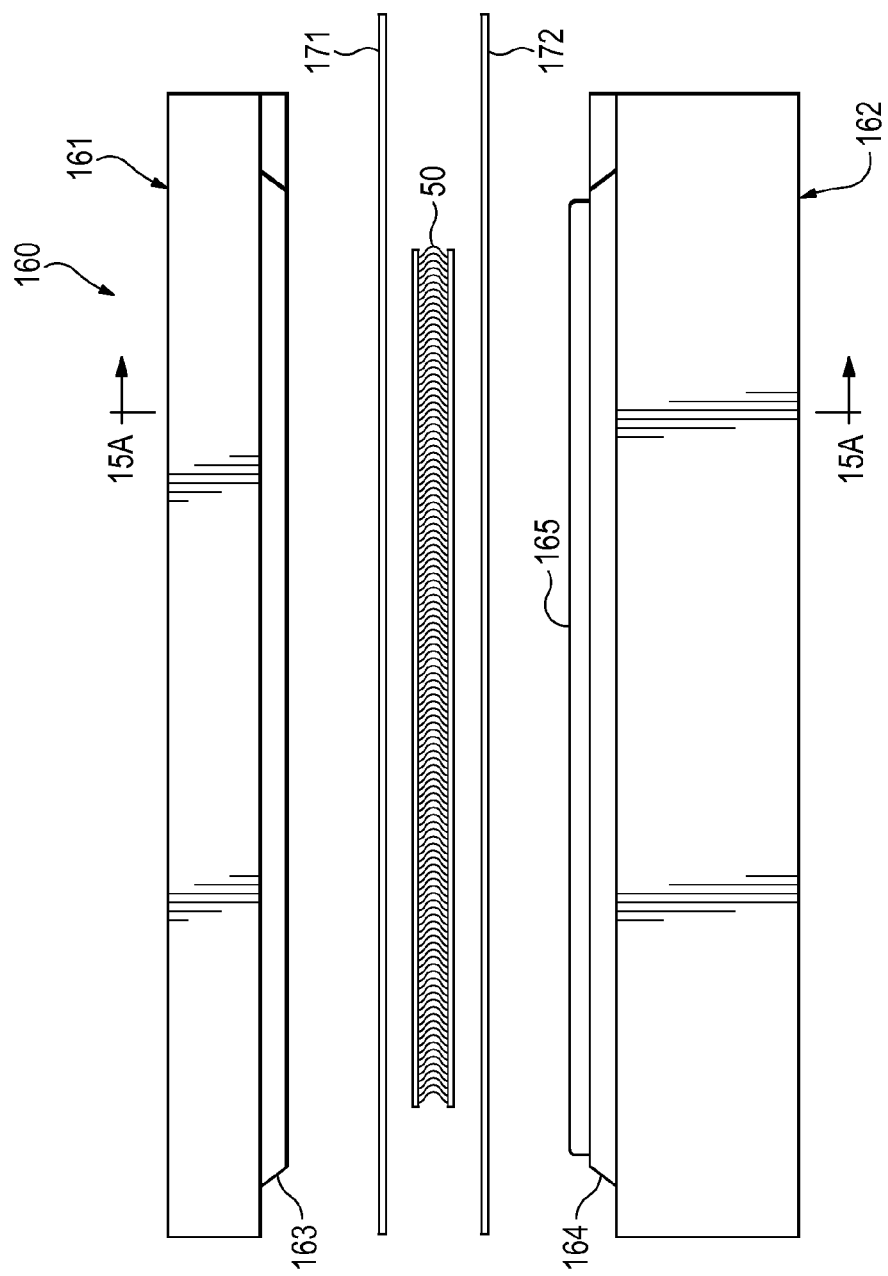
FIGS. 14A-14D are side elevational views of the second mold depicting steps in the second process for manufacturing the chamber.
Figure 15A:
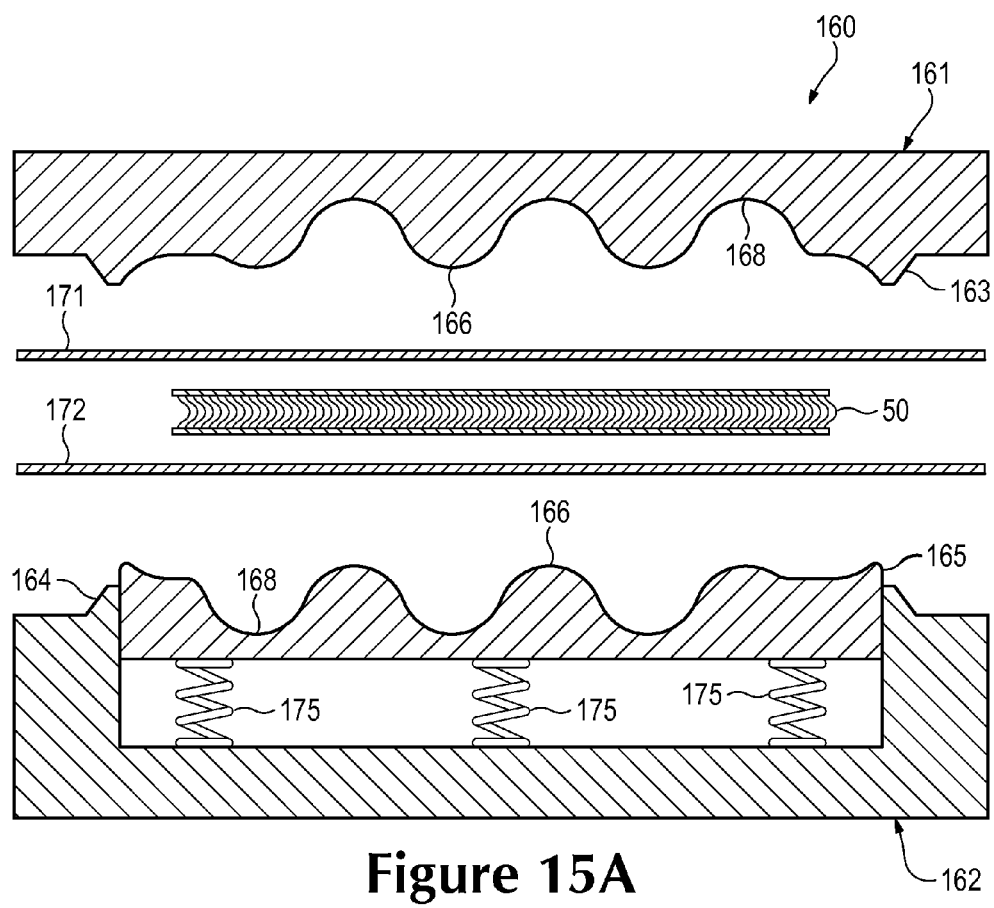
FIGS. 15A-15D are schematic cross-sectional views of the second mold, as defined by section lines 15A-15A through 15D-15D in FIGS. 14A-14D, depicting steps in the second process for manufacturing the chamber.

Following heating, the components of chamber 33 are located between mold portions 161 and 162, as depicted in FIGS. 14A and 15A. In order to properly position the components, a shuttle frame or other device may be utilized. Once positioned, mold portions 161 and 162 translate toward each other and begin to close upon the components such that (a) an upper ridge 163 of upper mold portion 161 contacts upper polymer layer 171, (b) a lower ridge 164 of lower mold portion 162 contacts lower polymer layer 172, and (c) polymer layers 171 and 172 begin bending around tensile member 50 so as to extend into a cavity within second mold 160. Accordingly, the components are located relative to second mold 160 and initial shaping and positioning has occurred.

Air may be partially evacuated from the area around polymer layers 171 and 172 through various vacuum ports in mold portions 161 and 162. The purpose of evacuating the air is to draw polymer layers 171 and 172 into contact with the various contours of second mold 160. This ensures that polymer layers 171 and 172 are properly shaped in accordance with the contours of second mold 160. Note that polymer layers 171 and 172 may stretch in order to extend around tensile member 50 and into second mold 160. In comparison with the thickness of barrier 40 in chamber 33, polymer layers 171 and 172 may exhibit greater thickness. This difference between the original thicknesses of polymer layers 171 and 172 and the resulting thickness of barrier 40 may occur as a result of the stretching that occurs during this stage of the thermoforming process.

In order to provide a second means for drawing polymer layers 171 and 172 into contact with the various contours of second mold 160, the area between polymer layers 171 and 172 and proximal tensile member 50 may be pressurized. During a preparatory stage of this method, an injection needle may be located between polymer layers 171 and 172, and the injection needle may be located such that ridges 163 and 164 envelop the injection needle when second mold 160 closes. A gas may then be ejected from the injection needle such that polymer layers 171 and 172 engage ridges 163 and 164, thereby forming an inflation conduit between polymer layers 171 and 172. The gas may then pass through the inflation conduit, thereby entering and pressurizing the area proximal to tensile member 50. In combination with the vacuum, the internal pressure ensures that polymer layers 171 and 172 contact the various portions of second mold 160.

Figure 14B:
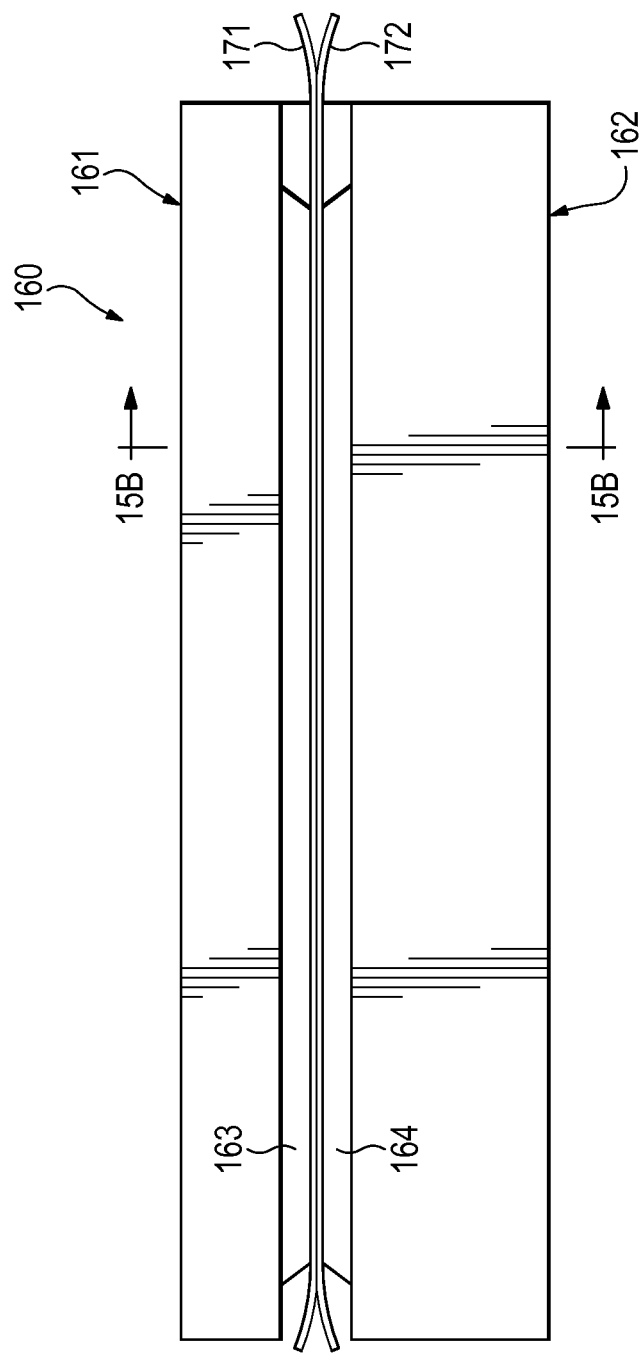
Figure 15B:
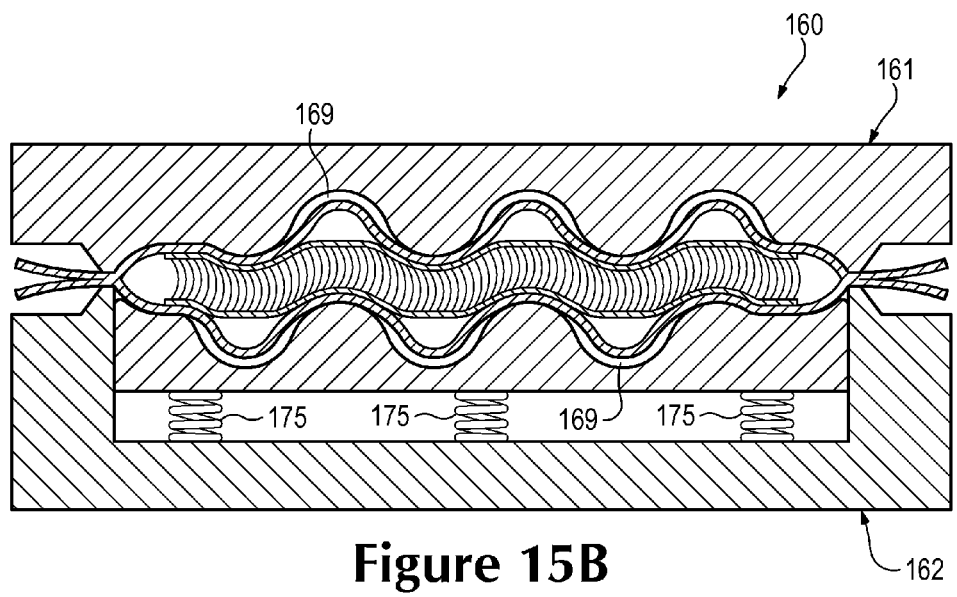

As second mold 160 closes further, ridges 163 and 164 bond polymer layers 171 and 172 together, as depicted in FIGS. 14B and 15B, thereby forming peripheral bond 44. In addition, a movable insert 165 that is supported by various springs 175 may depress to place a pressure upon the components, thereby bonding polymer layers 171 and 172 to tensile member 50. As discussed above, a supplemental layer or thermoplastic threads may be incorporated into tensile member 50 in order to facilitate bonding between tensile member 50 and polymer layers 171 and 172. The pressure exerted upon the components by movable insert 165 ensures that the supplemental layer or thermoplastic threads form a bond with polymer layers 171 and 172.

As depicted in FIGS. 13-15D, both upper mold portion 161 and movable insert 165 have surfaces defining a plurality of first mold areas 146 and a plurality of second mold areas 148. First mold areas 166 may be protrusions extending outward from upper mold portion 161 and lower mold portion 162, and second mold areas 168 may be indentations extending into upper mold portion 161 and lower mold portion 162. As discussed above with respect to first mold 60, first mold areas 166 and second mold areas 168 may impart different amounts of radio frequency energy, different amounts of pressure, or both. Additionally, the use of springs 175 may impart a common or overall degree of pressure to both first mold areas 166 and second mold areas 168. In turn, compression and irradiation applied at first mold areas 166 and second mold areas 168 may effectively impart the configuration of first areas 46 and second areas 48 to tensile member 50 and chamber 33.

Figure 14C:
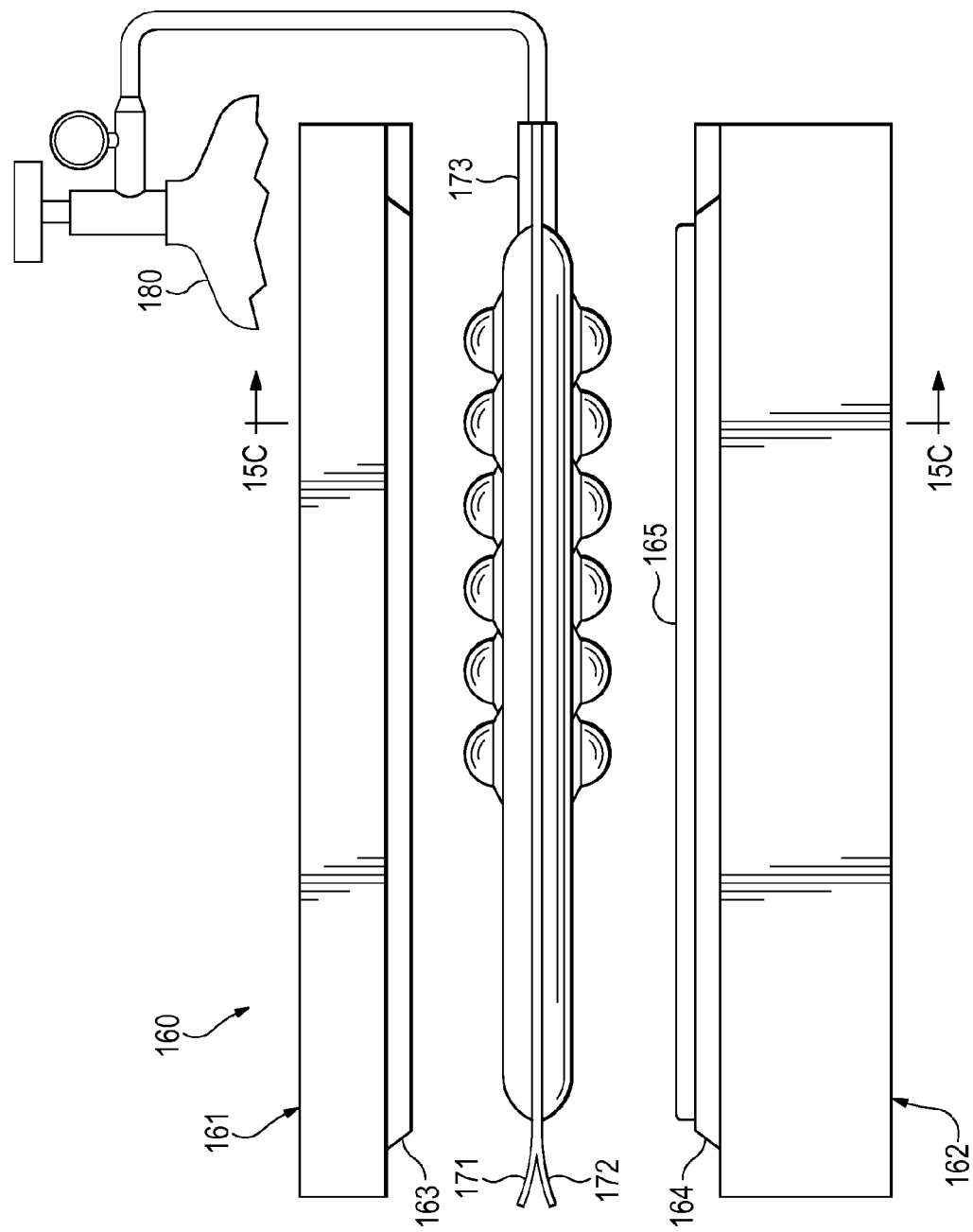
Figure 14D:
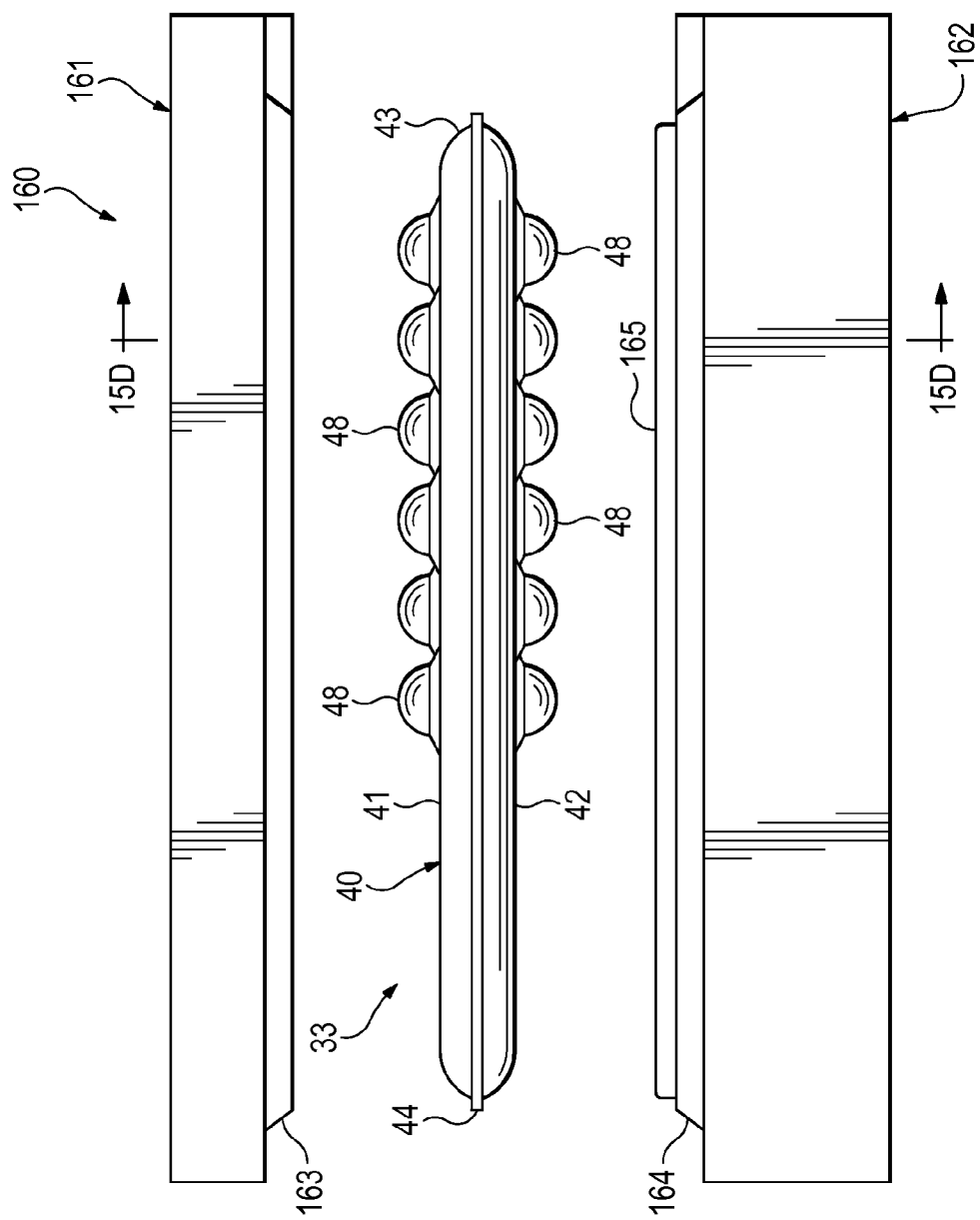
Figure 15C:
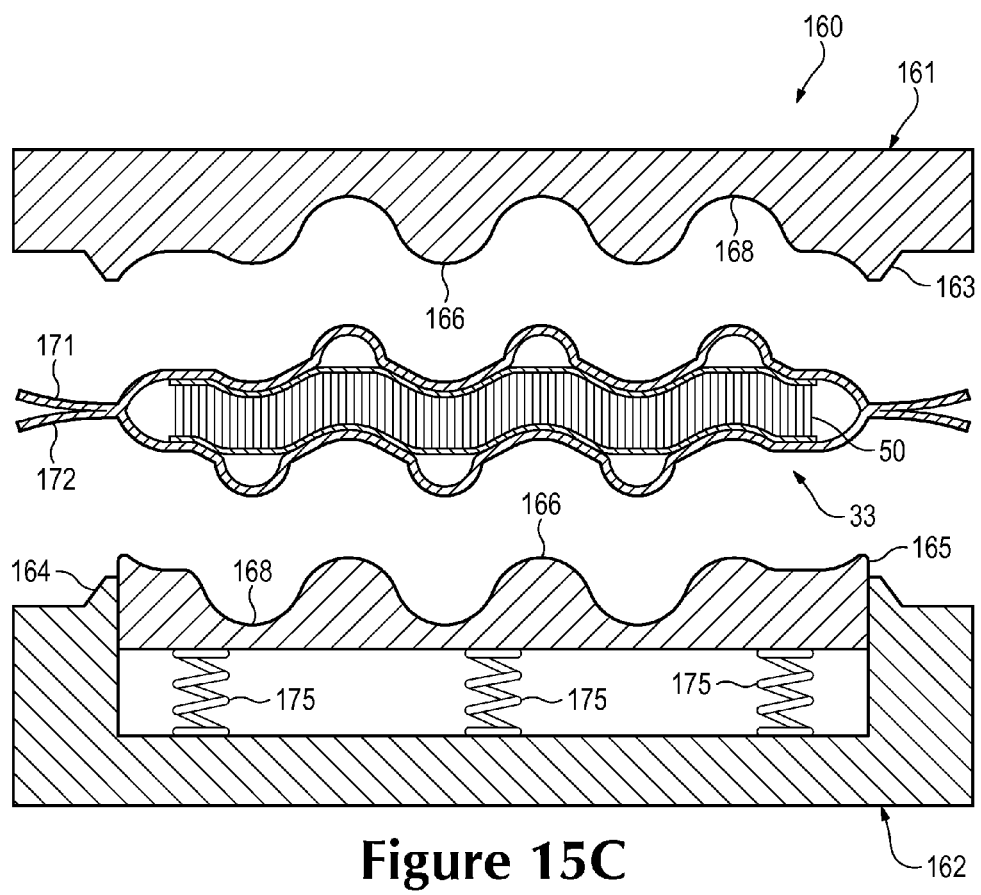
Figure 15D:
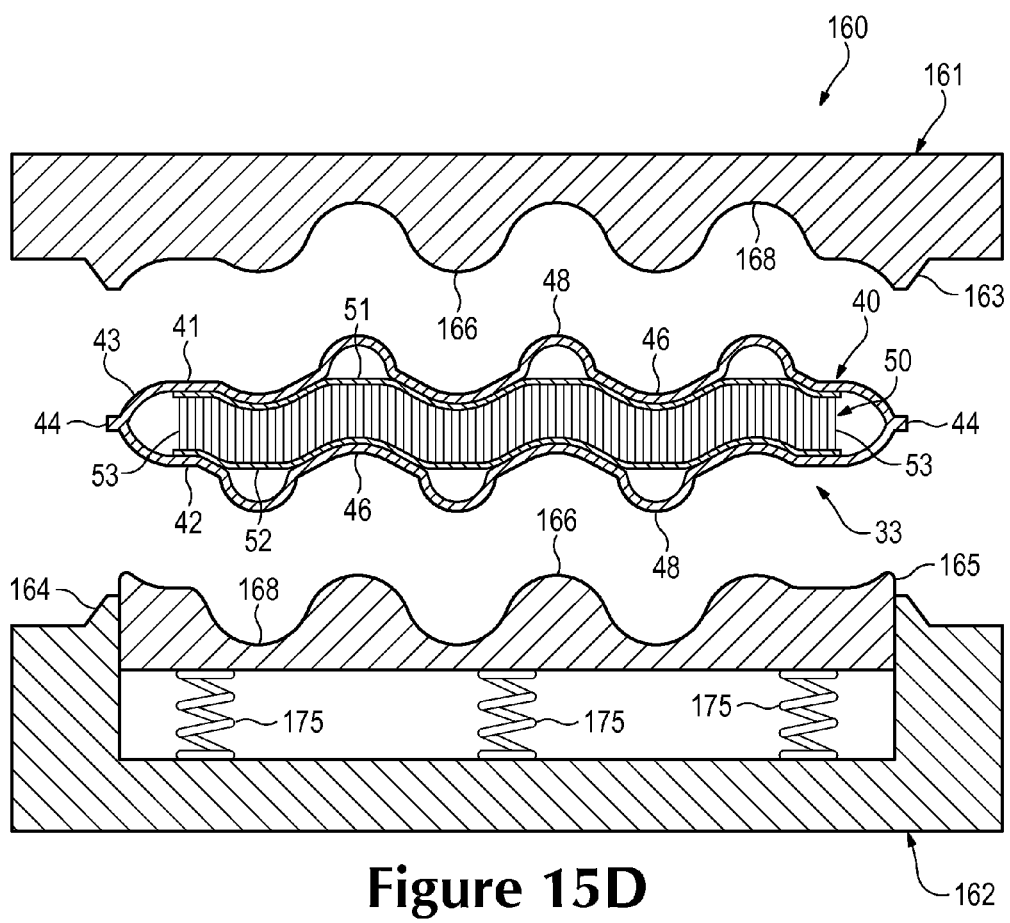

When bonding is complete, second mold 160 is opened and chamber 33 and excess portions of polymer layers 171 and 172 are removed and permitted to cool, as depicted in FIGS. 14C and 15C. A fluid may be injected into chamber 33 through inflation conduit 173. In addition, a sealing process may be utilized to seal inflation conduit 173 adjacent to chamber 33 after pressurization. The excess portions of polymer layers 171 and 172 are then removed, thereby completing the manufacture of chamber 33, as depicted in FIGS. 14D and 15D. As an alternative, the order of inflation and removal of excess material may be reversed. As a final step in the process, chamber 33 may be tested and then incorporated into midsole 31 of footwear 10.

Further Chamber Configurations

Chamber 33 is depicted individually in FIGS. 3-9C in a configuration that is suitable for footwear applications. Chamber 33 may have any a variety of other configurations also suitable for footwear applications. As discussed above, and as depicted in FIGS. 3-6, first areas 46 may have a substantially octagonal configuration, and second areas 48 may have a substantially square configuration. Additionally, as discussed above with respect to first mold 60, differing degrees of pressure may be applied by both first mold areas 66 and second mold areas 68 to chamber 33, including a common or overall degree of pressure.

For example, as discussed above and as depicted in FIGS. 5 and 9B, a first common or overall degree of pressure, or degree of compression, is applied by mold portions 61 and 62 to form substantially octagonal first areas 46 and substantially square second areas 48, and substantially octagonal first areas 46 form a continuous region in which upper barrier portion 41 is bonded to tensile member 50. In further configurations, other common or overall degrees of pressure may be applied by mold portions 61 and 62. In other words, first mold 60 may be compressed to differing degrees in the formation of first areas 46 and second areas 48. In turn, variance in a common or overall degree of pressure or degree of compression during molding may affect the configuration of first areas 46 and second areas 48. For example, varying the common or overall degree of pressure or degree of compression may result in the formation of first areas 46 that are continuous or connected and second areas 48 that are discontinuous or disconnected.

Figure 16D:
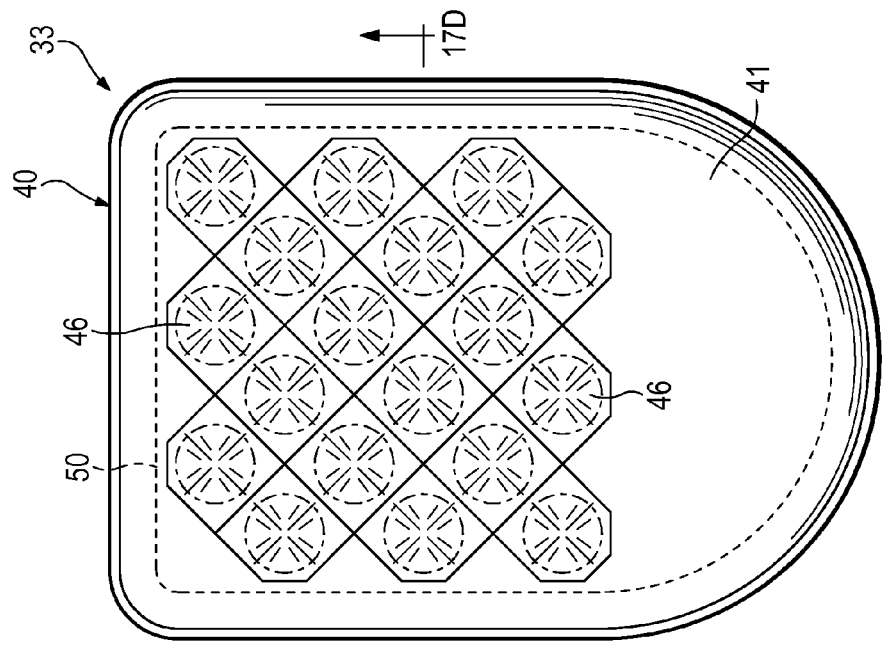
Figure 17A:
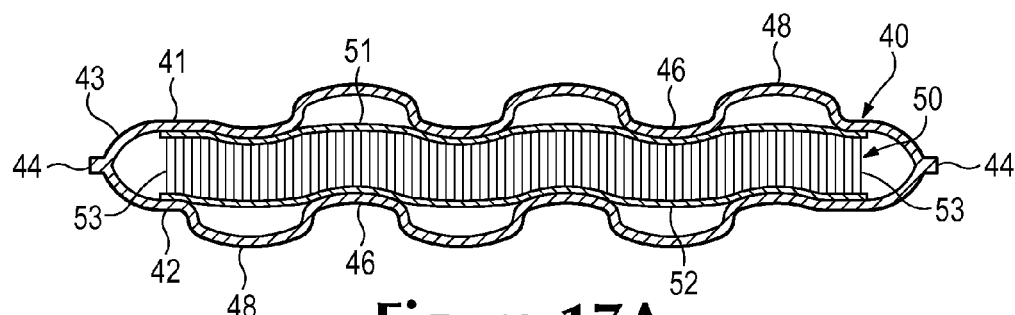
FIGS. 17A-17D are cross-sectional views corresponding with FIG. 9B and depicting additional configurations of the chamber.

For example, in a further configuration as depicted in FIGS. 16A and 17A, corresponding with a second, low degree of compression, first areas 46 have a substantially square configuration. At the same time, second areas 48 have a substantially square configuration, and form a continuous region in which upper barrier portion 41 is unbonded to tensile member 50.

Figure 17B:
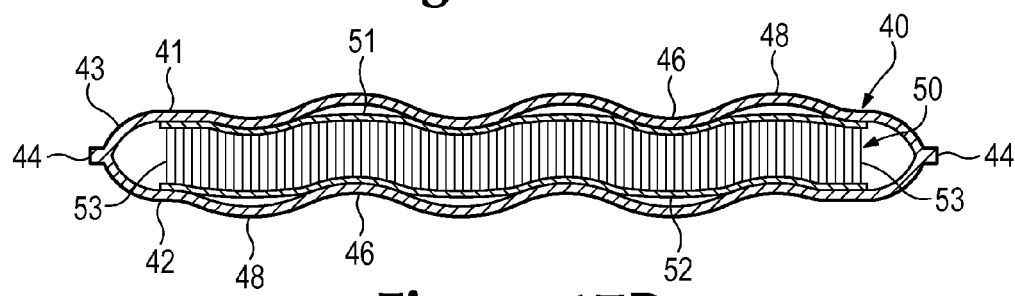

In another further configuration as depicted in FIGS. 16B and 17B, and corresponding with an third, intermediate degree of compression between the low degree of compression depicted in FIGS. 16A and 17A and the first degree of compression depicted in FIGS. 5 and 9B, first areas 46 and second areas 48 have substantially square configurations. As formed by this third degree of compression, first areas 46 do not form a continuous region in which upper barrier portion 51 is bonded to tensile member 50 as formed by the first degree of compression. Similarly, second areas 48 do not form a continuous region in which upper barrier portion 51 is unbonded to tensile member 50 as formed by the second degree of compression. Rather, first areas 46 and second areas 48 are formed to have substantially similar dimensional extent in alternating across upper barrier portion 41.

Figure 16C:
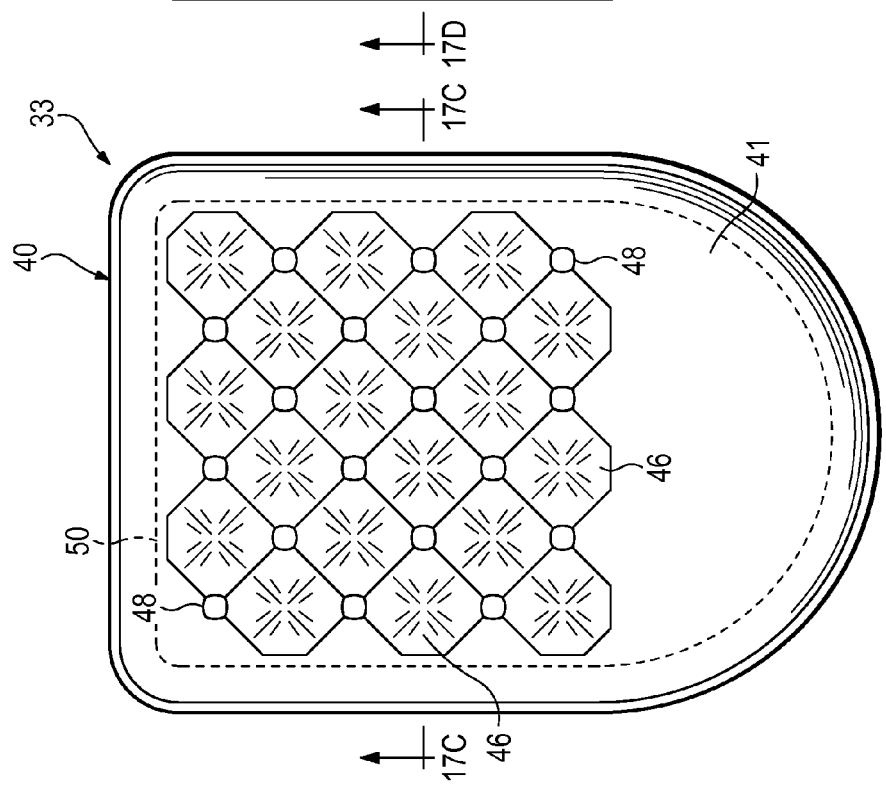
Figure 17C:
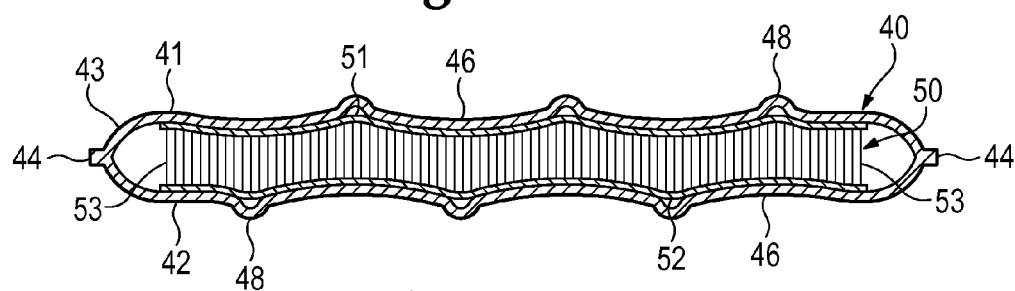

In yet another further configuration as depicted in FIGS. 16C and 17C, and corresponding with a fourth, intermediate degree of compression greater than the first degree of compression depicted in FIGS. 5 and 9B, first areas 46 have a substantially octagonal configuration, and form a continuous region in which upper barrier portion 41 is unbonded to tensile member 50. At the same time, second areas 48 have a substantially square configuration. In comparison to the first areas 46 and second areas 48 formed by the first degree of compression, first areas 46 formed by the fourth degree of compression are smaller. Accordingly, the continuous region in which upper barrier portion 41 is unbonded to tensile member 50 as formed by the fourth degree of compression has a greater extent across upper barrier portion 41.

Figure 17D:
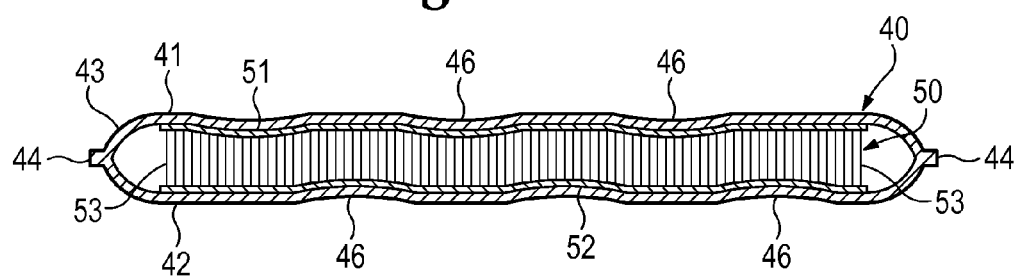

In a still further configuration as depicted in FIGS. 16D and 17D, and corresponding with a fifth, high degree of compression, first areas 46 have a substantially square configuration, whereas no second areas 48 have been formed. In other words, at the fifth, high degree of compression, upper barrier portion 41 is substantially free of protruding areas, unbonded areas, and areas spaced from tensile member 50.

As depicted in FIGS. 3-9C, tensile member 50 includes upper tensile layer 51, lower tensile layer 52, and connecting members 53. In further configurations, tensile member 50 may be otherwise configured. For example, tensile member 50 may have a first surface adjacent upper barrier portion 41 and an opposite second surface adjacent lower barrier portion 42, and tensile member 50 may extend between upper barrier portion 41 and lower barrier portion 42. Alternatively, tensile member 50 may have any of the range of configurations disclosed in U.S. patent application Ser. No. 12/630,642 to Peyton and may extend across an interior void of chamber 33. Additionally, tensile member 50 or a first surface of tensile member 50 may be bonded to, joined to, or otherwise secured to upper barrier portion 41 in a first manner, while tensile member 50 or a second surface of tensile member 50 opposite the first surface may be bonded to, joined to, or otherwise secured to lower barrier portion 42 in a second manner.

Figure 18A:
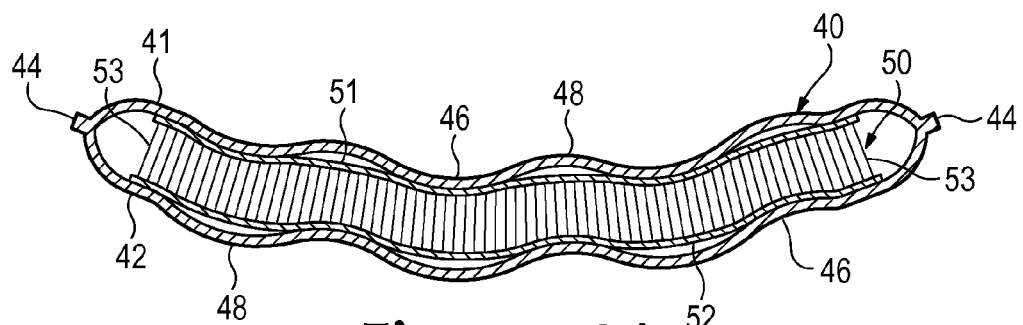
FIGS. 18A-18B are cross-sectional views corresponding with FIG. 9B and depicting additional configurations of the chamber.

As depicted in FIGS. 3-9C, chamber 33 has a substantially flat configuration. In further configurations, either upper barrier portion 41, lower barrier portion 42, or both may be formed to have contours in addition to the contours of first areas 46 and second areas 48. For example, in a further configuration as depicted in FIG. 18A, chamber 33 has a contour in which peripheral regions of chamber 33 are curved inward, or toward each other, giving chamber 33 a configuration of a cup or a pocket, such as a heel cup.

As depicted in FIGS. 3-9C, both barrier portions 41 and 42 may be formed to include first areas 46, second areas 48, or both. In other configurations, first areas 46, second areas 48, or both may selectively be formed on one of either upper barrier portion 41 or lower barrier portion 42, and the other barrier portion may be formed to not include first areas 46, second areas 48, or both.

Figure 18B:
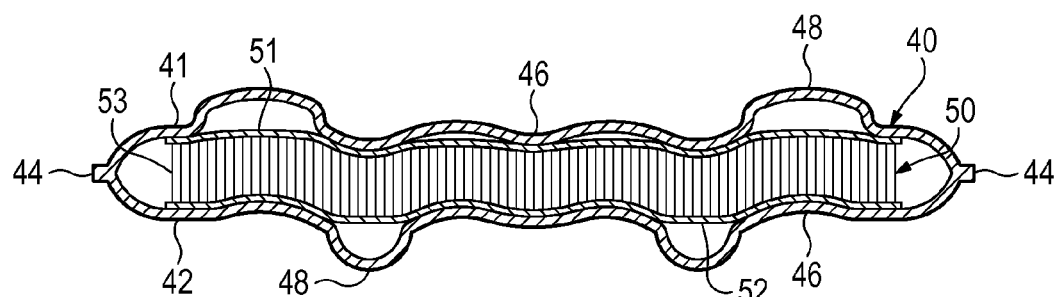

Overall or additional contours may be imparted to chamber 33 in a number of ways. For example, in another further configuration as depicted in FIG. 18B, the degree of compression applied during molding to peripheral regions of chamber 33 is greater than the degree of compression applied during molding to a central region of chamber 33. In other words, the degree of compression applied to chamber 33 during molding increases between the peripheral regions and the central region. In turn, second areas 48 in the peripheral regions of chamber 33 have a greater outward extent than the center of chamber 33, which is substantially free of second areas 48. In other words, chamber 33 has a configuration of a cup or a pocket, such as a heel cup. Accordingly, by controlling degrees of compression applied across chamber 33 during molding, chamber 33 may be given any of a range of contours, including cup contours, tapered contours, and arch contours. Other ways of imparting overall or additional contours or tapers to chamber 33 include the range of ways of imparting contours or tapers disclosed in U.S. patent application Ser. No. 12/123,612 to Dua and U.S. patent application Ser. No. 12/123,646 to Rapaport, et al.

Figure 19B:
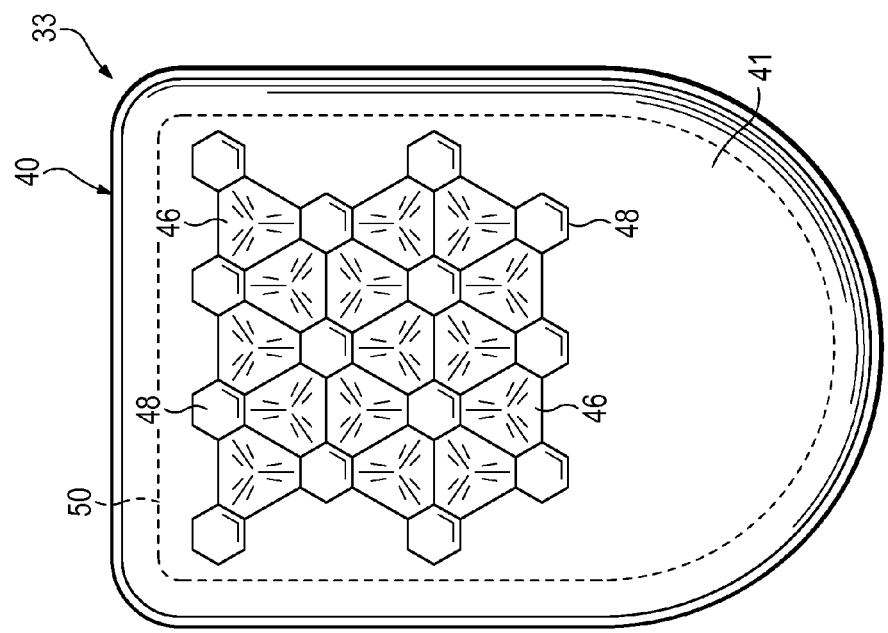
FIGS. 19A-19C are top plan views corresponding with FIG. 5 and depicting additional configurations of the chamber.
Figure 19A:
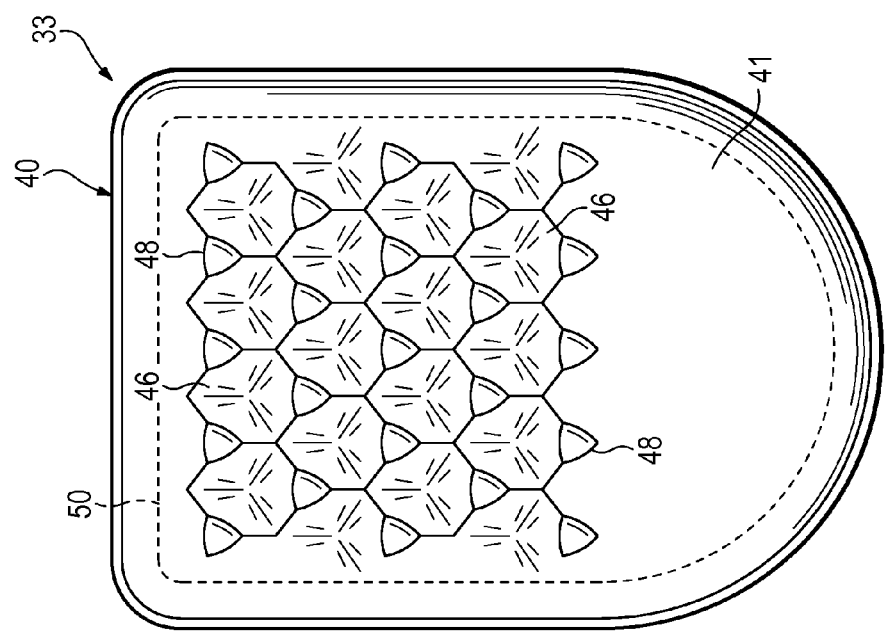
Figure 19C:
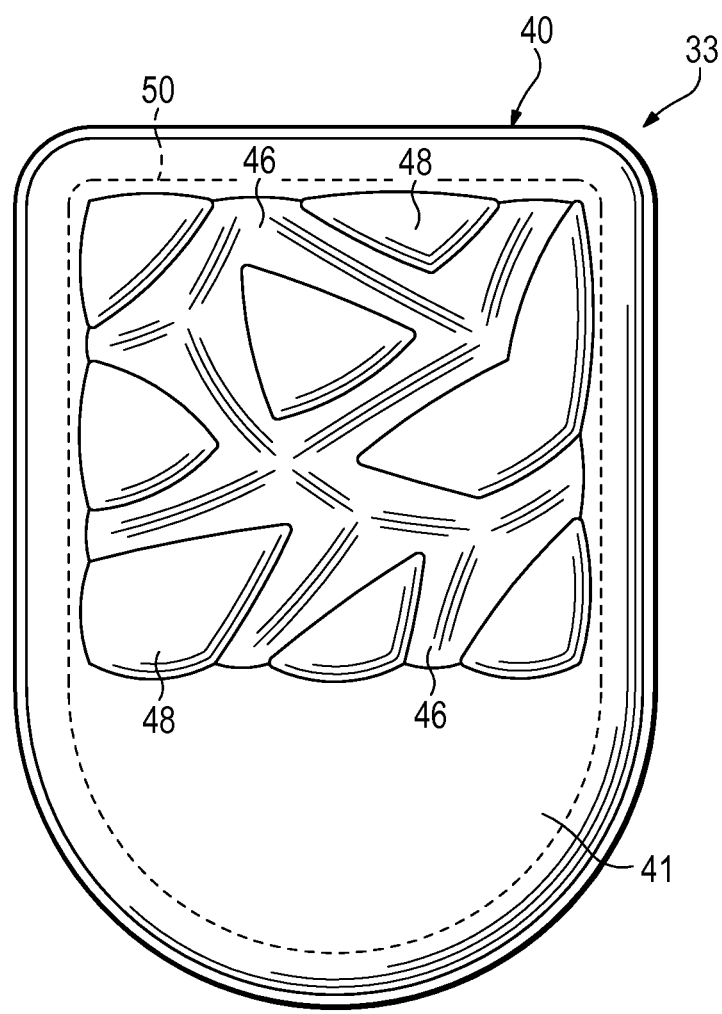

As depicted in FIGS. 3-6, first areas 46 and second areas 48 alternate regularly over upper barrier portion 41 in a first regularly repeating pattern aligned to a first square grid, and first areas 46 and second areas 48 alternate regularly over lower barrier portion 42 in a second regularly repeating pattern aligned to a second square grid. In further configurations, first areas 46 and second areas 48 may alternate in other ways. For example, as depicted in FIG. 19A, first areas 46 and second areas 48 may alternate regularly over upper barrier portion 41 in a regularly repeating pattern aligned to a hexagonal grid. In a further example, as depicted in FIG. 19B, first areas 46 and second areas 48 may alternate regularly over upper barrier portion 41 in a regularly repeating pattern aligned to a triangular grid. In yet another example, as depicted in Figure 19C, first areas 46 and second areas 48 may have no regular shape, or may alternate across upper barrier portion 41 in an irregular or unpatterned configuration.

Figure 20A:
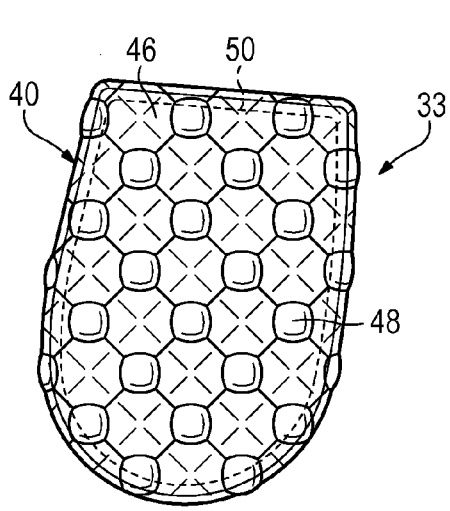
FIGS. 20A-20C are top plan views corresponding with FIG. 5 and depicting additional configurations of the chamber.
Figure 20C:
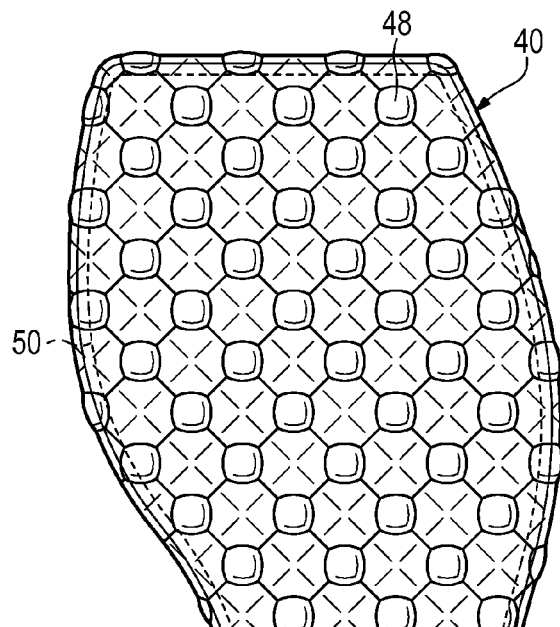
Figure 20B:
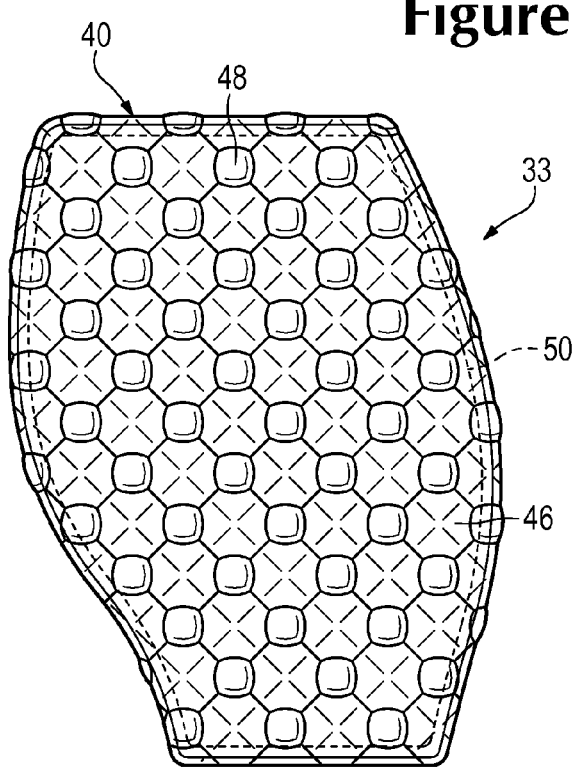

As depicted in FIGS. 3-6, chamber 33 has a configuration corresponding with heel region 13 of midsole 31, in which square regions of barrier portions 41 and 42 are formed to include first areas 46 and second areas 48. In further configurations, chamber 33 may correspond with other regions of midsole 31, and other regions of barrier portions 41 and 42 may be formed to include first areas 46 and second areas 48. For example, as depicted in FIG. 20A, substantially all of barrier portion 41 of chamber 33 corresponding with heel region 13 of midsole 31 may be formed to include first areas 46 and second areas 48. In a further example, as depicted in FIG. 20B, substantially all of barrier portion 41 of a chamber 33 corresponding with forefoot region 11 of midsole 31 may be formed to include first areas 46 and second areas 48. In yet another example, as depicted in FIG. 20C, substantially all of barrier portion 41 of a chamber 33 corresponding with a forefoot region 11, a midfoot region 12, and a heel region 13 of midsole 31 may be formed to include first areas 46 and second areas 48. In other words, chamber 33 may correspond with heel region 13 of midsole 31, forefoot region 11 of midsole 31, substantially all of midsole 31, or any region or regions of midsole 31.

Figure 21:
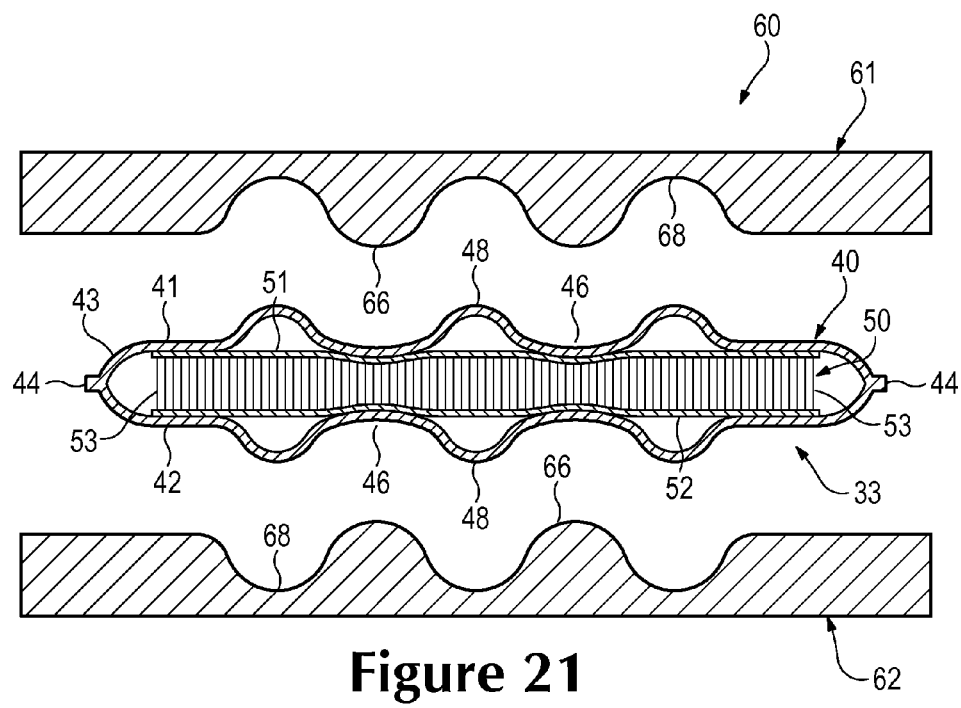
FIG. 21 is a schematic cross-sectional view corresponding with FIG. 12C depicting an additional configuration of the first mold.

As depicted in FIGS. 3-6 and 9A-9C, first areas 46 of upper barrier portion 41 are positioned opposite from second areas 48 of lower barrier portion 42, and second areas 48 of upper barrier portion 41 are positioned opposite from first areas 46 of lower barrier portion 42. In other words, the pattern of first areas 46 and second areas 48 of upper barrier portion 41 has essentially a 180-degree offset or phase difference with respect to the pattern of first areas 46 and second areas 48 of lower barrier portion 42. In further configurations, first areas 46 and second areas 48 of upper barrier portion 41 may be otherwise positioned with respect to second areas 48 and first areas 46, respectively, of lower barrier portion 42. For example, as depicted in FIG. 21, first areas 46 of upper barrier portion 41 may be positioned opposite from first areas 46 of lower barrier portion 42, and second areas 48 of upper barrier portion 41 may be positioned opposite from second areas 48 of lower barrier portion 42. In other words, the pattern of first areas 46 and second areas 48 of upper barrier portion 41 may have essentially no offset or phase difference with respect to the pattern of first areas 46 and second areas 48 of lower barrier portion 42, and may instead be substantially aligned with or in phase with the pattern of first areas 46 and second areas 48 of lower barrier portion 42. In other configurations, the pattern of first areas 46 and second areas 48 of upper barrier portion 41 may have any offset or phase difference with respect to the pattern of first areas 46 and second areas 48 of lower barrier portion 42.

As depicted in FIGS. 3-6, the axes of the pattern of first areas 46 and second areas 48 of upper barrier portion 41 are aligned with the axes of the pattern of first areas 46 and second areas 48 on lower barrier portion 42. In other configurations, the axes of the pattern of the pattern of first areas 46 and second areas 48 of upper barrier portion 41 may be rotated at some angle with respect to the axes of the pattern of first areas 46 and second areas 48 of lower barrier portion 42. For example, the pattern of first areas 46 and second areas 48 of upper barrier portion 41 may be formed to have a 45-degree rotation with respect to the pattern of first areas 46 and second areas 48 of lower barrier portion 42.

Figure 23A:
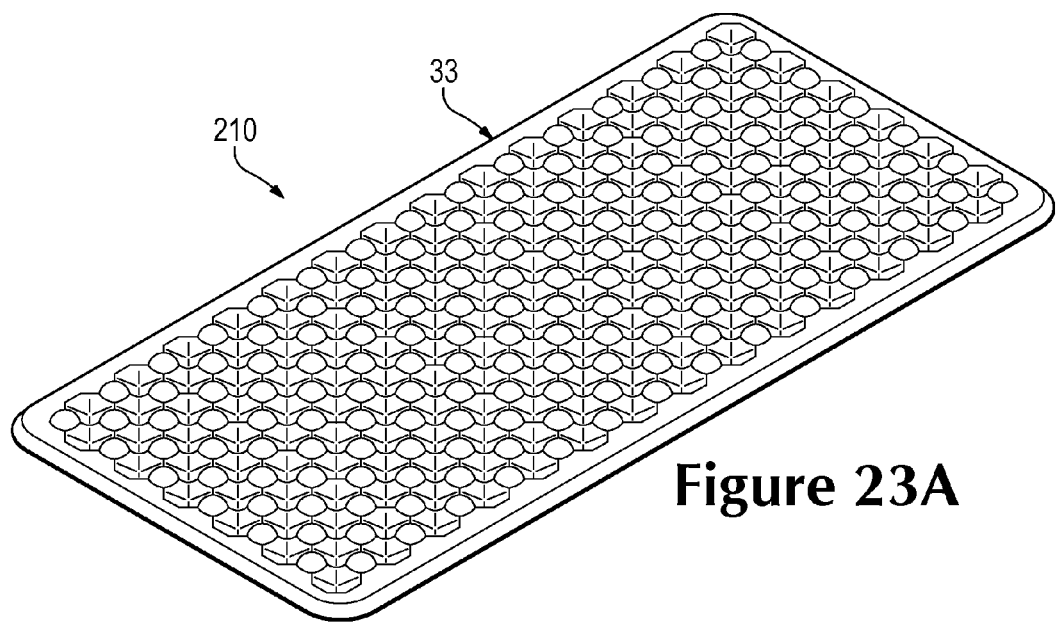
FIGS. 23A-23C are perspective views of other articles incorporating fluid-filled chambers.
Figure 23B:
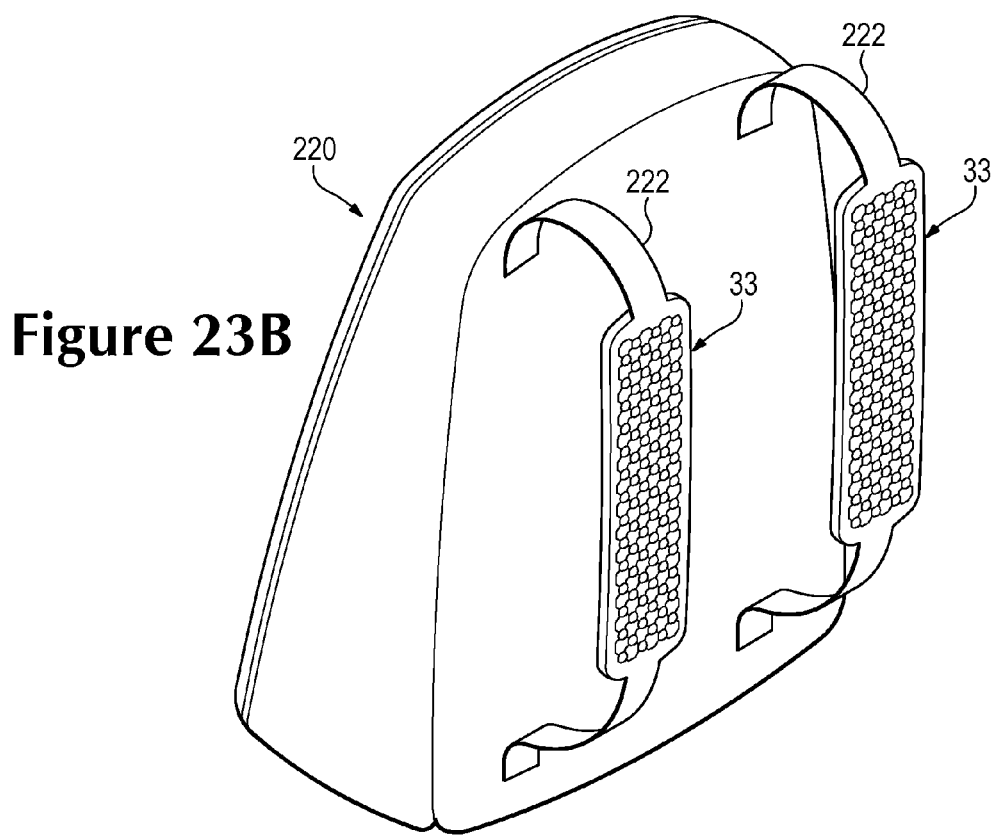
Figure 23C:
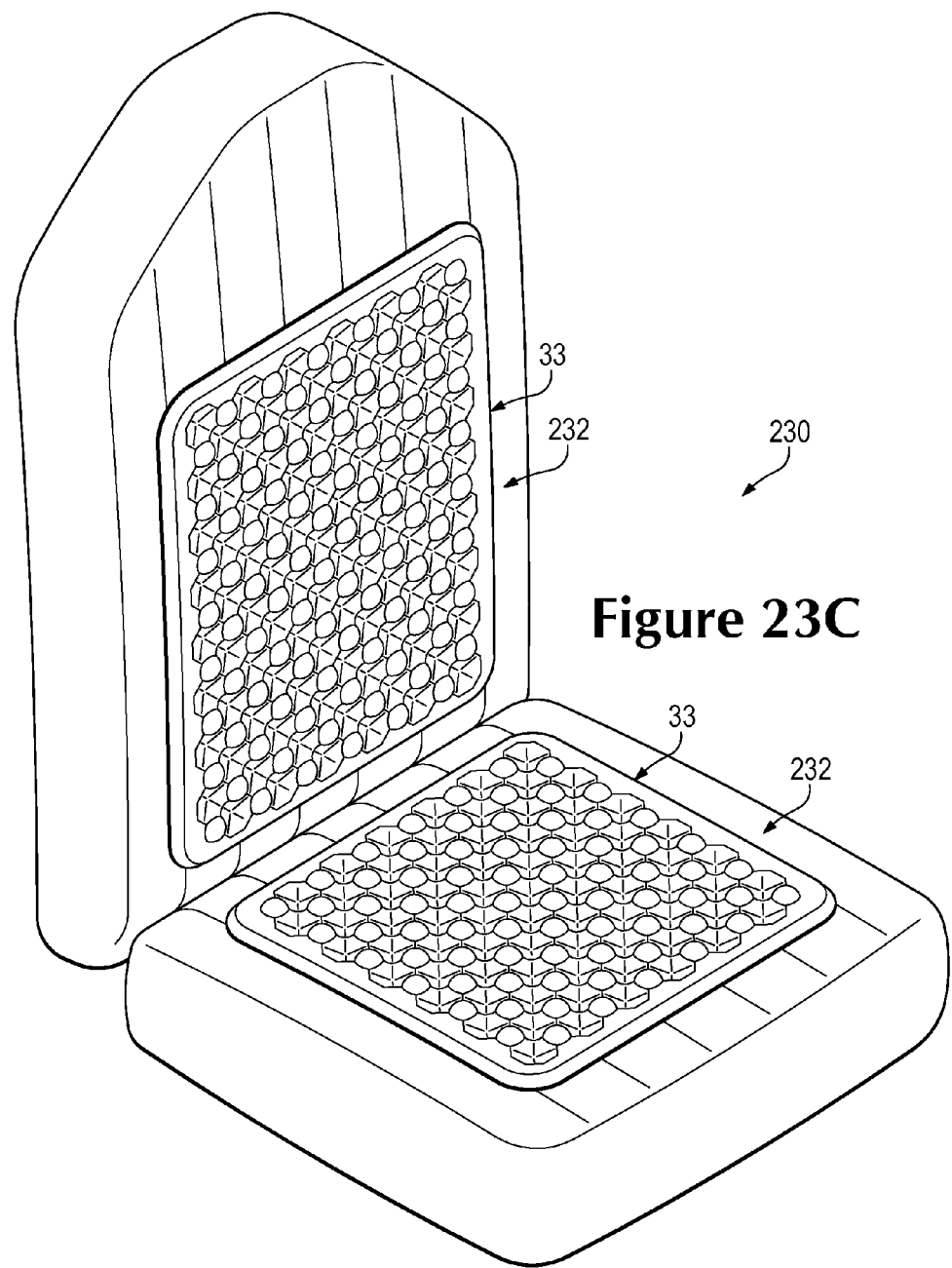

Chamber 33 is discussed above as having a configuration that is suitable for footwear. In addition to footwear, chambers having similar configurations may be incorporated into products other than footwear. For example, as depicted in FIG. 23A, a chamber 33 may be configured suitably for incorporation into a mat 210 to be utilized, for example, during yoga or as a camping pad to provide a comfortable surface for sitting or laying on the ground. In a further example, as depicted in FIG. 23B, chambers 33 may be configured suitably for incorporation into carrying straps 222 of a backpack 220. In yet another example, as depicted in FIG. 23C, chambers 33 may be configured suitably for incorporation into seat cushions 232 for use with seat 230.

Further Manufacturing Processes

In the first manufacturing process, as depicted in FIGS. 10-12C, first mold areas 66 of upper mold portion 61 are positioned opposite from second mold areas 68 of lower mold portion 62, and second mold areas 68 of upper mold portion 61 are positioned opposite from first mold areas 66 of lower mold portion 62. In other words, the pattern of first mold areas 66 and second mold areas 68 of upper mold portion 61 has essentially a 180-degree offset or phase difference with respect to the pattern of first mold areas 66 and second mold areas 68 of lower mold portion 62. In further configurations, first mold areas 66 and second mold areas 68 of upper mold portion 61 may be otherwise positioned with respect to second mold areas 68 and first mold areas 66 of lower mold portion 62. For example, as depicted in FIG. 21, first mold areas 66 of upper mold portion 61 may be positioned opposite from first mold areas 66 of lower mold portion 62, and second mold areas 68 of upper mold portion 61 may be positioned opposite from second mold areas 68 of lower mold portion 62. In other words, the pattern of first mold areas 66 and second mold areas 68 of upper mold portion 61 may have essentially no offset or phase difference with respect to the pattern of first mold areas 66 and second mold areas 68 of lower mold portion 62, and may instead be substantially aligned with or in phase with the pattern of first mold areas 66 and second mold areas 68 of lower barrier portion 62.

Figure 22A:
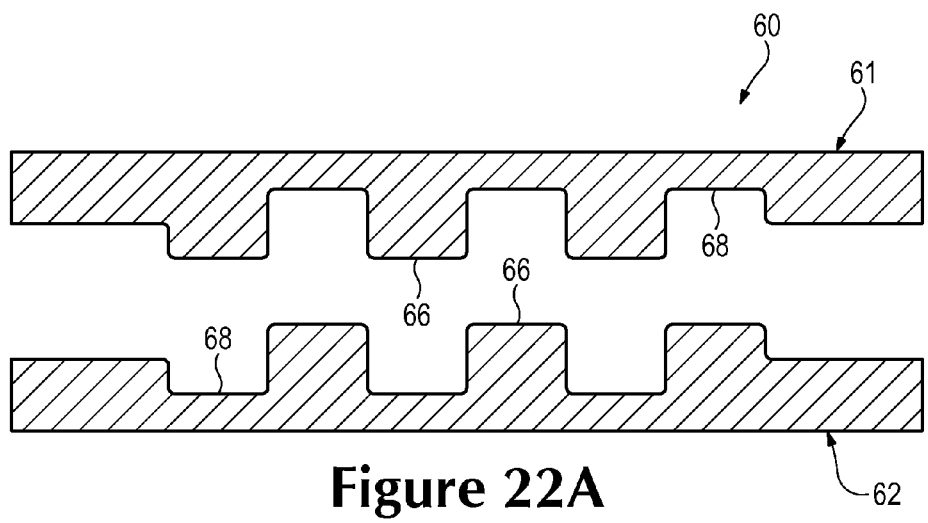
FIGS. 22A-22E are schematic cross-sectional views corresponding with FIG. 12A and depicting additional configurations of the first mold.
Figure 22B:
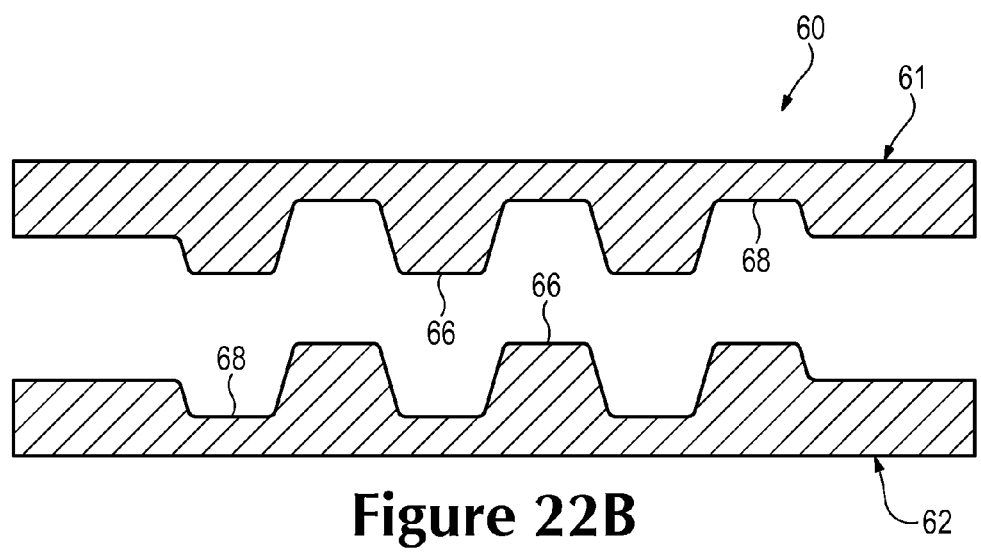
Figure 22C:
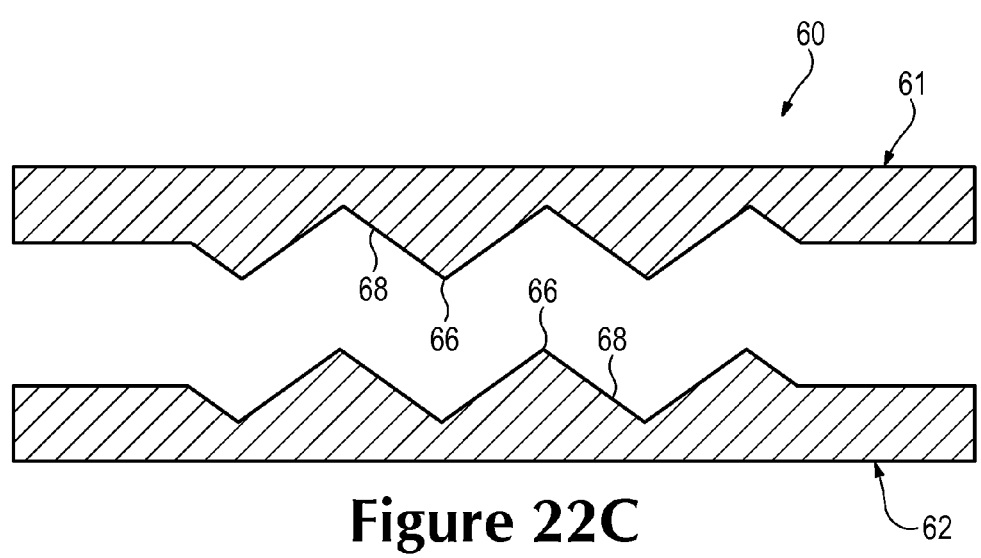
Figure 22D:
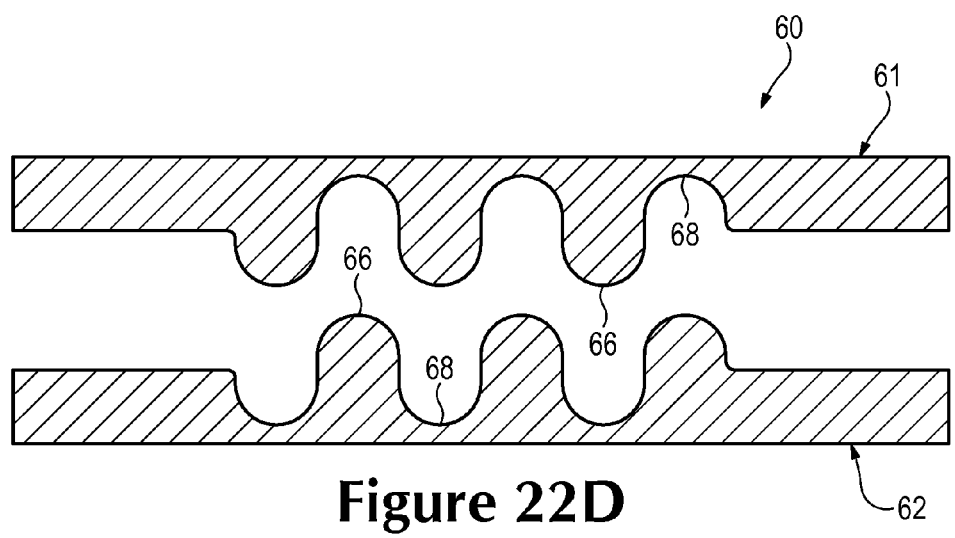
Figure 22E:
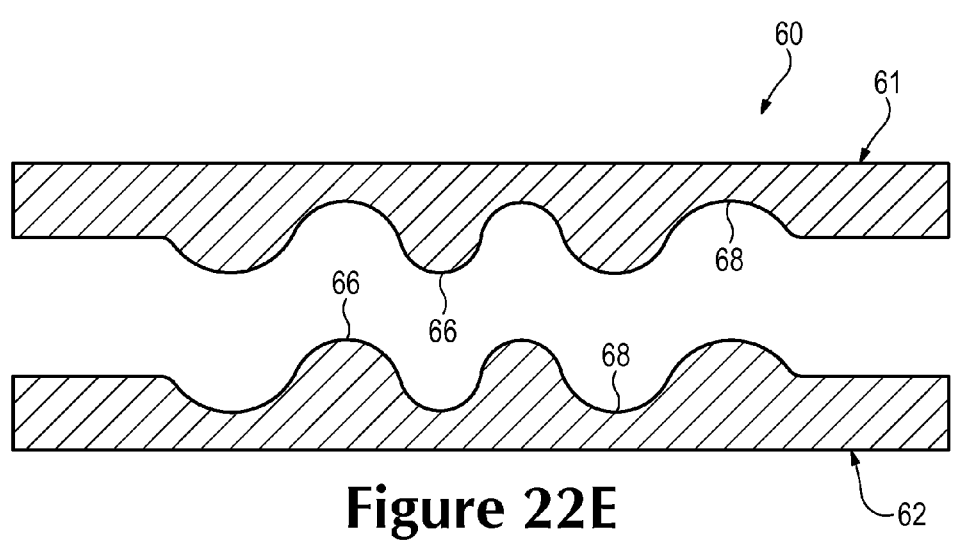

In the first manufacturing process, as depicted in FIGS. 10-12C, first mold areas 66 and second mold areas 68 of mold portions 61 and 62 sinusoidally alternate between extending outward from mold portions 61 and 62 and extending into mold portions 61 and 62. In further configurations, first mold areas 66 and second mold areas 68 may otherwise alternate between extending outward from and into mold portions 61 and 62, and may differ in cross-sectional configuration, height, or width. For example, as depicted in FIG. 22A, first mold areas 66 and second mold areas 68 have substantially rectangular or square configurations in cross-section that alternate between extending outward from and into mold portions 61 and 62. In a further example, as depicted in FIG. 22B, first mold areas 66 and second mold areas 68 have substantially trapezoidal configurations in cross-section that alternate between extending outward from and into mold portions 61 and 62. In a still further example, as depicted in FIG. 22C, first mold areas 66 and second mold areas 68 have substantially triangular or saw-toothed configurations in cross-section that alternate between extending outward from and into mold portions 61 and 62. In another example, as depicted in FIG. 22D, first mold areas 66 and second mold areas 68 have non-sinusoidal but partially curvilinear configurations in cross-section that alternate between extending outward from and into mold portions 61 and 62. In yet another example, as depicted in FIG. 22E, first mold areas 66 and second mold areas 68 are broader toward a periphery of mold portions 61 and 62 than toward the centers of mold portions 61 and 62.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

What is claimed is:

1. A method of manufacturing a fluid-filled chamber, the method comprising:
   locating a tensile member between a first polymer sheet and a second polymer sheet, the tensile member having a first layer, an opposite second layer, and a plurality of connecting members;
   pressing the first polymer sheet against the first layer and the second polymer sheet against the second layer to form (a) a plurality of indentations in the first polymer sheet in the configuration of a first regularly repeating pattern and (b) a plurality of indentations in the second polymer sheet in the configuration of a second regularly repeating pattern, the first regularly repeating pattern being offset from the second regularly repeating pattern;
   joining the first polymer sheet and the second polymer sheet to form a peripheral bond and thereby form a chamber; and
   pressurizing the chamber to place the connecting members in tension.

2. The method of claim 1, wherein the first regularly repeating pattern and the second regularly repeating pattern are based on a grid.

3. The method of claim 2, wherein the grid is selected from a group consisting of a square grid, a hexagonal grid, or a triangular grid.

4. The method of claim 1, wherein in the step of pressing, the first regularly repeating pattern has a 180-degree offset with respect to the second regularly repeating pattern.

5. The method of claim 1, wherein the tensile member is a spacer textile.

6. The method of claim 1, wherein the step of pressing includes forming a plurality of protrusions in the first polymer sheet.

7. The method of claim 6, wherein the protrusions in the first polymer sheet are formed opposite the indentations in the second polymer sheet.

8. The method of claim 6, wherein the protrusions in the first polymer sheet are spaced from the tensile member.

9. A method of manufacturing a fluid-filled chamber, the method comprising:
locating a first polymer sheet and a second polymer sheet between a first mold portion and a second mold portion, the first mold portion having a plurality of convex areas in a first regularly repeating pattern aligned to a first grid, and the second mold portion having a plurality of convex areas in a second regularly repeating pattern aligned to a second grid;
positioning a tensile member between a first polymer sheet and a second polymer sheet, the tensile member being a spacer textile and having a first layer, a second layer, and at least one connecting member;
compressing the first polymer sheet, the tensile member, and the second polymer sheet between the first mold portion and the second mold portion; and
joining the first polymer sheet and the second polymer sheet to form a peripheral bond;
wherein in the step of compressing, the first grid is offset from the second grid.

10. The method of claim 9, wherein in the step of compressing, the first grid has a 180-degree offset with respect to the second grid.

11. The method of claim 9, wherein the first grid is selected from a group consisting of a square grid, a hexagonal grid, or a triangular grid.

12. The method of claim 9, wherein the first mold portion has a plurality of concave areas.

13. The method of claim 12, wherein the step of compressing further includes aligning the plurality of concave areas of the first mold portion opposite the plurality of convex areas of the second mold portion.

14. A method of manufacturing a fluid-filled chamber, the method comprising:
providing a mold having a first mold portion and a second mold portion, the first mold portion having a plurality of protrusions aligned to a first grid, and the second mold portion having a plurality of protrusions aligned to a second grid;
locating a first polymer sheet, a second polymer sheet, and a tensile member between the first mold portion and the second mold portion, the first polymer sheet being positioned adjacent to the first mold portion, the second polymer sheet being positioned adjacent to the second mold portion, and the tensile member being positioned between the first polymer sheet and the second polymer sheet;
positioning the first mold portion and the second mold portion such that the first grid is offset from the second grid;
compressing the first polymer sheet, the second polymer sheet, and the tensile member between the first mold portion and the second mold portion to (a) bond the first polymer sheet to the tensile member, (b) bond the second polymer sheet to the tensile member; and
bonding the first polymer sheet to the second polymer sheet around at least a portion of a periphery of the tensile member.

15. The method of claim 14, wherein in the step of positioning, the first grid has a 180-degree offset with respect to the second grid.

16. The method of claim 14, wherein the first grid is selected from a group consisting of a square grid, a hexagonal grid, or a triangular grid.

17. The method of claim 14, wherein the tensile member is a spacer textile.

18. The method of claim 14, wherein the first mold portion has a plurality of indentations.

19. The method of claim 18, wherein the step of positioning further includes aligning the indentations of the first mold portion opposite the protrusions of the second mold portion.

* * * * *